(12) United States Patent
Kobayashi

(10) Patent No.: US 11,127,370 B2
(45) Date of Patent: Sep. 21, 2021

(54) FIELD-SEQUENTIAL IMAGE DISPLAY DEVICE AND IMAGE DISPLAY METHOD

(71) Applicant: SHARP KABUSHIKI KAISHA, Osaka (JP)

(72) Inventor: Masamitsu Kobayashi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 455 days.

(21) Appl. No.: 16/096,670

(22) PCT Filed: Apr. 19, 2017

(86) PCT No.: PCT/JP2017/015683
§ 371 (c)(1),
(2) Date: Oct. 25, 2018

(87) PCT Pub. No.: WO2017/188080
PCT Pub. Date: Nov. 2, 2017

(65) Prior Publication Data
US 2021/0151004 A1    May 20, 2021

(30) Foreign Application Priority Data
Apr. 26, 2016  (JP) .............................. JP2016-088211

(51) Int. Cl.
*G09G 3/36* (2006.01)
*G09G 5/10* (2006.01)

(52) U.S. Cl.
CPC ............. *G09G 5/10* (2013.01); *G09G 3/3607* (2013.01); *G09G 2320/041* (2013.01); *G09G 2320/0646* (2013.01); *G09G 2320/0666* (2013.01)

(58) Field of Classification Search
CPC ............... G09G 5/10; G09G 2320/041; G09G 2320/0646; G09G 3/3607; G09G 3/34;
(Continued)

(56) References Cited

U.S. PATENT DOCUMENTS 7,027,105 B2 * 4/2006 Lee .......................... H04N 9/68
348/687
7,277,075 B1   10/2007 Hirano et al.
(Continued)

FOREIGN PATENT DOCUMENTS

JP       2001-147666 A     5/2001
JP       2008-139809 A     6/2008

*Primary Examiner* — Rodney Amadiz
(74) *Attorney, Agent, or Firm* — ScienBiziP, P.C.

(57) ABSTRACT

An image display device 1 includes an image data conversion unit 10 that performs conversion processing of converting input image data D1 into driving image data D2 for each pixel, and a display unit 20 that displays a plurality of subframes based on the driving image data D2, in one frame period. In the conversion processing in the image data conversion unit 10, for each pixel, the hue and the saturation of the input image data D1 and the hue and the saturation of the driving image data D2 in an HSV color space are held to be respectively equal to each other. The image data conversion unit 10 computes a coefficient Ks used in the conversion processing, and performs the conversion processing using the coefficient Ks. The coefficient Ks varies depending on a brightness V and has a value causing a brightness after the conversion processing to increase as the brightness V becomes greater if the saturations S are equal to each other. The difference between a minimum value and a maximum value of the coefficient Ks is set to decrease as the brightness V becomes smaller. Thus, an occurrence of noise at a low-luminance portion of a display image is suppressed.

21 Claims, 20 Drawing Sheets

(58) Field of Classification Search
CPC .......... G09G 3/20; G09G 3/36; G09G 3/3648; G09G 2320/0626; G09G 2320/0666; G09G 2310/0235; G09G 2340/06; G09G 3/3413; G02F 1/133
See application file for complete search history.

(56) References Cited

U.S. PATENT DOCUMENTS

| | | | |
|---|---|---|---|
| 9,311,888 B2* | 4/2016 | Takahashi | G09G 5/02 |
| 9,460,675 B2* | 10/2016 | Harada | G09G 3/3426 |
| 10,810,953 B2* | 10/2020 | Kobayashi | G09G 3/3413 |
| 2008/0180384 A1 | 7/2008 | Aoki et al. | |
| 2019/0052853 A1* | 2/2019 | Yoshida | H04N 9/77 |
| 2019/0287470 A1* | 9/2019 | Kobayashi | G09G 3/20 |

* cited by examiner

FIELD-SEQUENTIAL IMAGE DISPLAY DEVICE AND IMAGE DISPLAY METHOD

TECHNICAL FIELD

The present invention relates to an image display device, and particularly, to a field sequential type image display device and a field sequential type image display method.

BACKGROUND ART

Conventionally, a field sequential type image display device that displays a plurality of subframes in one frame period is known. For example, a typical field sequential type image display device includes a backlight including a red light source, a green light source, and a blue light source, and displays red, green, and blue subframes in one frame period. When a red subframe is displayed, a display panel is driven based on red image data, and the red light source emits light. A green subframe and a blue subframe are displayed in the similar manner. Three subframes displayed in a time division manner are combined on the retinae of an observer by an afterimage phenomenon, and thus the observer recognizes these subframes as one color image.

In the field sequential type image display device, when the eyeline of the observer moves in a display screen, a situation in which the observer looks as if the colors of the subframes are separated from each other may occur (this phenomenon is referred to as color breakup). In order to suppress the occurrence of color breakup, an image display device that displays a white subframe in addition to the red, green, and blue subframes is known. An image display device that performs amplification processing of multiplying input image data by one or more coefficients when driving image data including red image data, green image data, blue image data, and white image data is obtained based on the input image data including red image data, green image data, and blue image data is known.

As the related art, PTLs 1 and 2 disclose a method of obtaining driving image data including red image data, green image data, blue image data, and white image data based on input image data including red image data, green image data, and blue image data, in an image display device which includes subpixels of red, green, and blue colors and is not the field sequential type.

CITATION LIST

Patent Literature

PTL 1: Japanese Unexamined Patent Application Publication No. 2001-147666
PTL 2: Japanese Unexamined Patent Application Publication No. 2008-139809

SUMMARY OF INVENTION

Technical Problem

A field sequential type image display device that obtains a distribution ratio and a coefficient used in amplification processing based on input image data, and obtains driving image data by using the distribution ratio and the coefficient which have been obtained is considered below. In such an image display device, for example, using a function of obtaining the coefficient based on the saturation of input image data is considered.

However, if a function in which the coefficient largely changes with the saturation changing is used as the function of obtaining the coefficient based on the saturation, the color of a pixel largely changes between the pixel and the adjacent pixel. Thus, gradation skipping occurs, and compression noise components and the like which originally have a small luminance difference and have been inconspicuous becomes conspicuous, particularly, at a display gradation of a low luminance. The portion at which gradation skipping occurs is not limited to a low-luminance portion, but such noise is referred to as "noise occurring at a low-luminance portion" or "low-luminance-portion noise" Even though the methods disclosed in PTLs 1 and 2 are used, it is not possible to suppress an occurrence of noise at a low-luminance portion of a display image.

Thus, an object of the present invention is to provide a field-sequential image display device and an image display method in which it is possible to suppress the occurrence of noise at a low-luminance portion of a display image.

Solution to Problem

The object can be achieved, for example, by a field sequential type image display device as follows. An image display device includes an image data conversion unit that obtains driving image data corresponding to a plurality of subframes including a common color subframe based on input image data corresponding to a plurality of color components, and a display unit that displays the plurality of subframes based on the driving image data, in one frame period. The image data conversion unit performs conversion processing of converting first image data corresponding to the plurality of color components into second image data corresponding to the plurality of subframes, for each pixel. In the conversion processing, for each pixel, a hue and a saturation of the first image data and a hue and a saturation of the second image data in an HSV color space are held to be respectively equal to each other. The image data conversion unit computes a coefficient used in the conversion processing and performs the conversion processing using the coefficient. The coefficient varies depending on a brightness and has a value causing a brightness after the conversion processing to increase as the brightness becomes greater if the saturations are equal to each other. A difference between a minimum value and a maximum value of the coefficient becomes smaller as the brightness decreases.

The object can be achieved, for example, by a field sequential type image display method as follows. An image display method includes an image-data conversion step of obtaining driving image data corresponding to a plurality of subframes including a common color subframe based on input image data corresponding to a plurality of color components, and a display step of displaying the plurality of subframes based on the driving image data, in one frame period. In the image-data conversion step, conversion processing of converting first image data corresponding to the plurality of color components into second image data corresponding to the plurality of subframes is performed for each pixel. In the conversion processing, for each pixel, a hue and a saturation of the first image data and a hue and a saturation of the second image data in an HSV color space are held to be respectively equal to each other. In the image-data conversion step, a coefficient used in the conversion processing is computed, and the conversion processing is performed using the coefficient. The coefficient varies depending on a brightness and has a value causing a brightness after the conversion processing to increase as the brightness becomes greater if the saturations are equal to each other. A difference between a minimum value and a maximum value of the coefficient becomes smaller as the brightness decreases.

Advantageous Effects of Invention

According to such a field sequential type image display device or image display method, the coefficient is obtained to vary depending on the brightness and to have a value causing a brightness after the conversion processing to increase as the brightness becomes greater if the saturations are equal to each other. Thus, it is possible to hold gradation properties. The difference between the minimum value and the maximum value of the coefficient is set to decrease as the brightness becomes smaller. Thus, it is possible to suppress the occurrence of noise at a low-luminance portion of a display image by reducing the amount of the coefficient changing with respect to the amount of the saturation changing, when the brightness is small. Thus, it is possible to suppress the occurrence of noise at a low-luminance portion of a display image while gradation properties are held.

DESCRIPTION OF EMBODIMENTS

Hereinafter, image display devices and image display methods according to embodiments will be described with reference to the drawings. Firstly, the following is noted. "Computation" provided in the following descriptions includes the meaning that "a computation result is stored in a table in advance, and the computation result is obtained based on the table", in addition to the meaning of "obtaining a computation result with a computing machine".

First Embodiment

Figure 1:
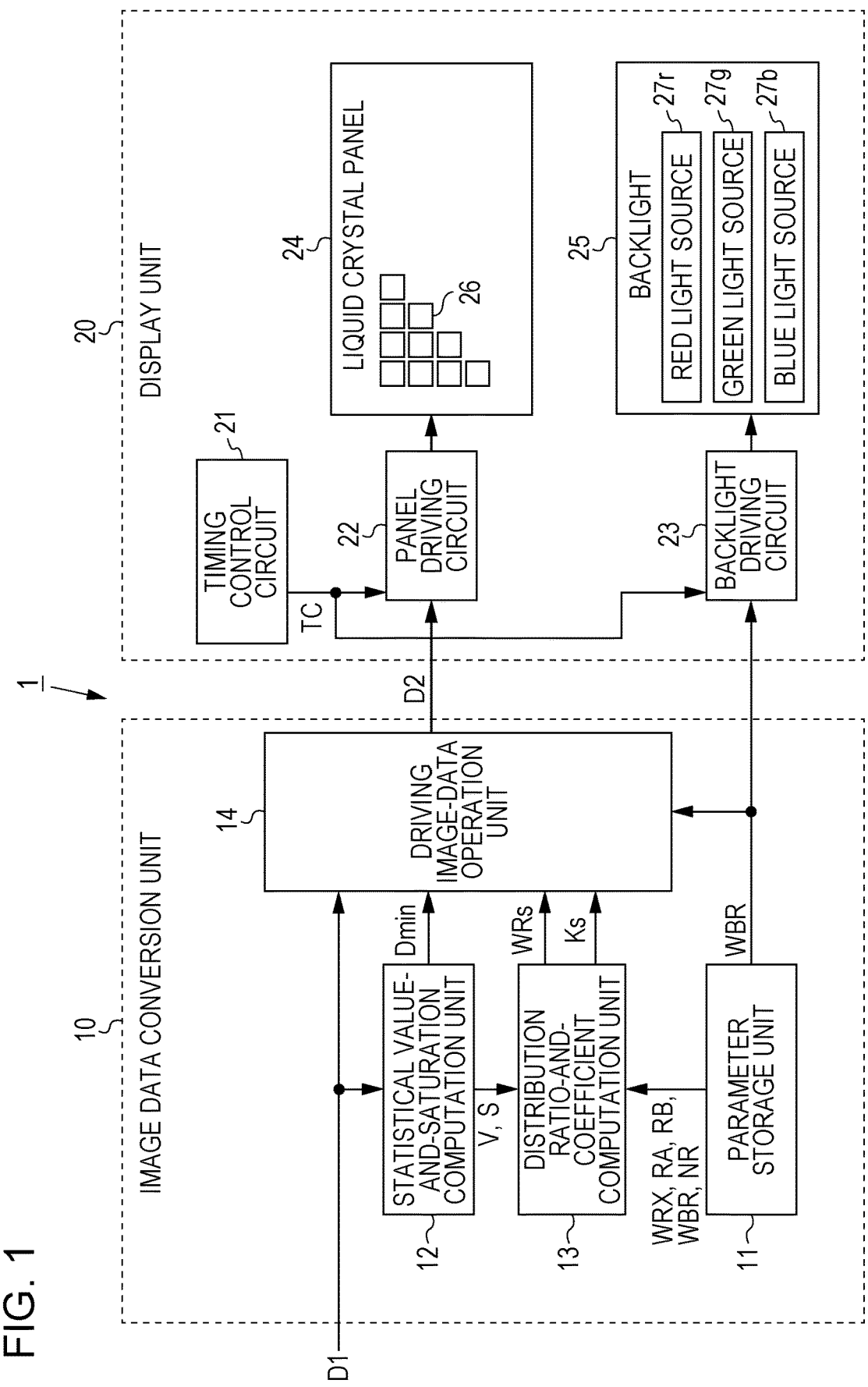
FIG. 1 is a block diagram illustrating a configuration of an image display device according to a first embodiment.

FIG. 1 is a block diagram illustrating a configuration of an image display device according to a first embodiment. An image display device 1 illustrated in FIG. 1 includes an image data conversion unit 10 and a display unit 20. The image data conversion unit 10 includes a parameter storage unit 11, a statistical value-and-saturation computation unit 12, a distribution ratio-and-coefficient computation unit 13, and a driving image-data operation unit 14. The display unit 20 includes a timing control circuit 21, a panel driving circuit 22, a backlight driving circuit 23, a liquid crystal panel 24, and a backlight 25. The image display device 1 has a function of performing low-luminance-portion noise handling processing.

The image display device 1 is a color-field sequential liquid crystal display apparatus. The image display device 1 divides one frame period into a plurality of subframes periods and displays different subframes in the subframe periods. Hereinafter, it is assumed that the image display device 1 divides one frame period into four subframe periods and respectively displays white, blue, green, and red subframes in first to fourth subframe periods. In the image display device 1, a white subframe is a common color subframe.

Input image data D1 including red image data, green image data, and blue image data is input to the image display device 1. The image data conversion unit 10 obtains driving image data D2 corresponding to white, blue, green, and red subframes, based on the input image data D1. The processing is referred to as "image-data conversion processing" below. Pieces of the driving image data D2 corresponding to white, blue, green, and red subframes are referred to as "white image data, blue image data, green image data, and red image data which are included in the driving image data D2", respectively. The display unit 20 displays the white, blue, green, and red subframes based on the driving image data D2, in one frame period.

The timing control circuit 21 outputs a timing control signal TC to the panel driving circuit 22 and the backlight driving circuit 23. The panel driving circuit 22 drives the liquid crystal panel 24 based on the timing control signal TC and the driving image data D2. The backlight driving circuit 23 drives the backlight 25 based on the timing control signal TC. The liquid crystal panel 24 includes a plurality of pixels 26 arranged in two dimensions. The backlight 25 includes a red light source 27r, a green light source 27g, and a blue light source 27b. The backlight 25 may include a white light source. For example, a light emitting diode (LED) is used as the light source 27.

In the first subframe period, the panel driving circuit 22 drives the liquid crystal panel 24 based on white image data included in the driving image data D2, and the backlight driving circuit 23 causes the red light source 27r, the green light source 27g, and the blue light source 27b to emit light. Thus, a white subframe is displayed. In a case where the backlight 25 includes a white light source, the backlight driving circuit 23 may cause the white light source to emit light in the first subframe period.

In the second subframe period, the panel driving circuit 22 drives the liquid crystal panel 24 based on blue image data included in the driving image data D2, and the backlight driving circuit 23 causes the blue light source 27b to emit light. Thus, a blue subframe is displayed. In the third subframe period, the panel driving circuit 22 drives the liquid crystal panel 24 based on green image data included in the driving image data D2, and the backlight driving circuit 23 causes the green light source 27g to emit light. Thus, a green subframe is displayed. In the fourth subframe period, the panel driving circuit 22 drives the liquid crystal panel 24 based on red image data included in the driving image data D2, and the backlight driving circuit 23 causes the red light source 27r to emit light. Thus, a red subframe is displayed.

Details of the image data conversion unit 10 will be described below. Red image data, green image data, and blue image data which are included in the input image data D1 are luminance data normalized to have a value of 0 to 1. When pieces of image data of three colors are equal to each other, the pixel 26 becomes achromatic. Red image data, green image data, and blue image data which are included in the driving image data D2 are also luminance data normalized to have a value of 0 to 1.

In the image-data conversion processing, white image data (having a value to be distributed to a common color subframe) included in the driving image data D2 is determined in a range of 0 to the minimum value of the pieces of image data of the three colors, which are included in the input image data D1. A distribution ratio WRs is a ratio of white image data to the maximum value (minimum value of the pieces of image data of the three colors) which may be taken by the white image data. This maximum value is obtained for each pixel. For example, in a case where the distribution ratio WRs is determined to be 0.6 when red image data included in input image data D1 is 0.5, and green image data and blue image data are 1, white image data included in driving image data D2 is 0.3.

The parameter storage unit 11 stores parameters WRX, RA, RB, WBR, and NR used in image-data conversion processing. The statistical value-and-saturation computation unit 12 obtains the maximum value Dmax, the minimum value Dmin, and the saturation S based on input image data D1, for each pixel. The maximum value Dmax is equal to the brightness V in an HSV color space. Thus, in the following descriptions, the maximum value Dmax is described as the brightness V. The distribution ratio-and-coefficient computation unit 13 obtains the distribution ratio WRs and a coefficient Ks used in amplification and compression processing, based on the brightness V, the saturation S, and the parameters WRX, RA, RB, WBR, and NR (details will be described later). The driving image-data operation unit 14 obtains driving image data D2 based on the input image data D1, the minimum value Dmin, the distribution ratio WRs, the coefficient Ks, and the parameter WBR.

The parameters stored in the parameter storage unit 11 will be described below. The parameter NR indicates whether or not low-luminance-portion noise handling processing is performed, and takes a value of 0 or 1. The value of 0 indicates that low-luminance-portion noise handling processing is not performed. The value of 1 indicates that the low-luminance-portion noise handling processing is performed. The parameter WRX is a parameter depending on response characteristics of a pixel 26 provided in the display unit 20. The parameter WRX is included in a calculation expression of obtaining the distribution ratio WRs.

The minimum value of driving image data D2 in one frame period is set as DDmin, and the maximum value thereof is set as DDmax. In a case where low-luminance-portion noise handling processing is not performed, the distribution ratio-and-coefficient computation unit 13 obtains the coefficient Ks in accordance with the parameters RA and RB stored in the parameter storage unit 11, so as to satisfy the following expression (1).

$$DDmax \leq RA \cdot DDmin + RB \tag{1}$$

Figure 2:
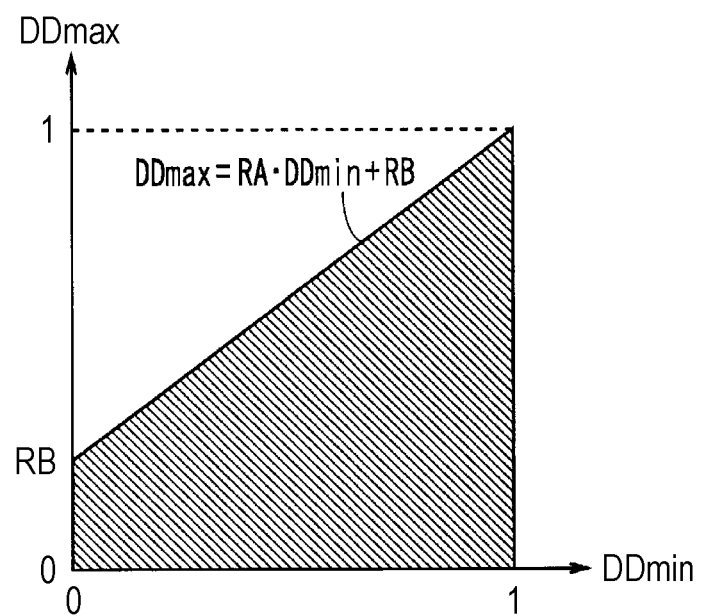
FIG. 2 is a diagram illustrating a parameter in the image display device according to the first embodiment.

For example, in a case of RB=1−RA, the range satisfying the expression (1) corresponds to a shaded area illustrated in FIG. 2. As described above, the parameters RA and RB designate the range of the maximum value DDmax in accordance with the minimum value DDmin.

The parameter WBR designates the luminance of the light source 27 which is used when a white subframe is displayed and is provided in the backlight 25. The parameter WBR takes a value in a range of 0 WBR 1. The display unit 20 controls the luminance of the light source 27 in accordance with the parameter WBR, when displaying a white subframe. More specifically, the backlight driving circuit 23 in the display unit 20 controls the luminance of the light source 27 of when a white subframe is displayed, to be WBR times the luminance of the light source 27 of when other subframes are displayed, in accordance with the parameter WBR.

Figure 3:
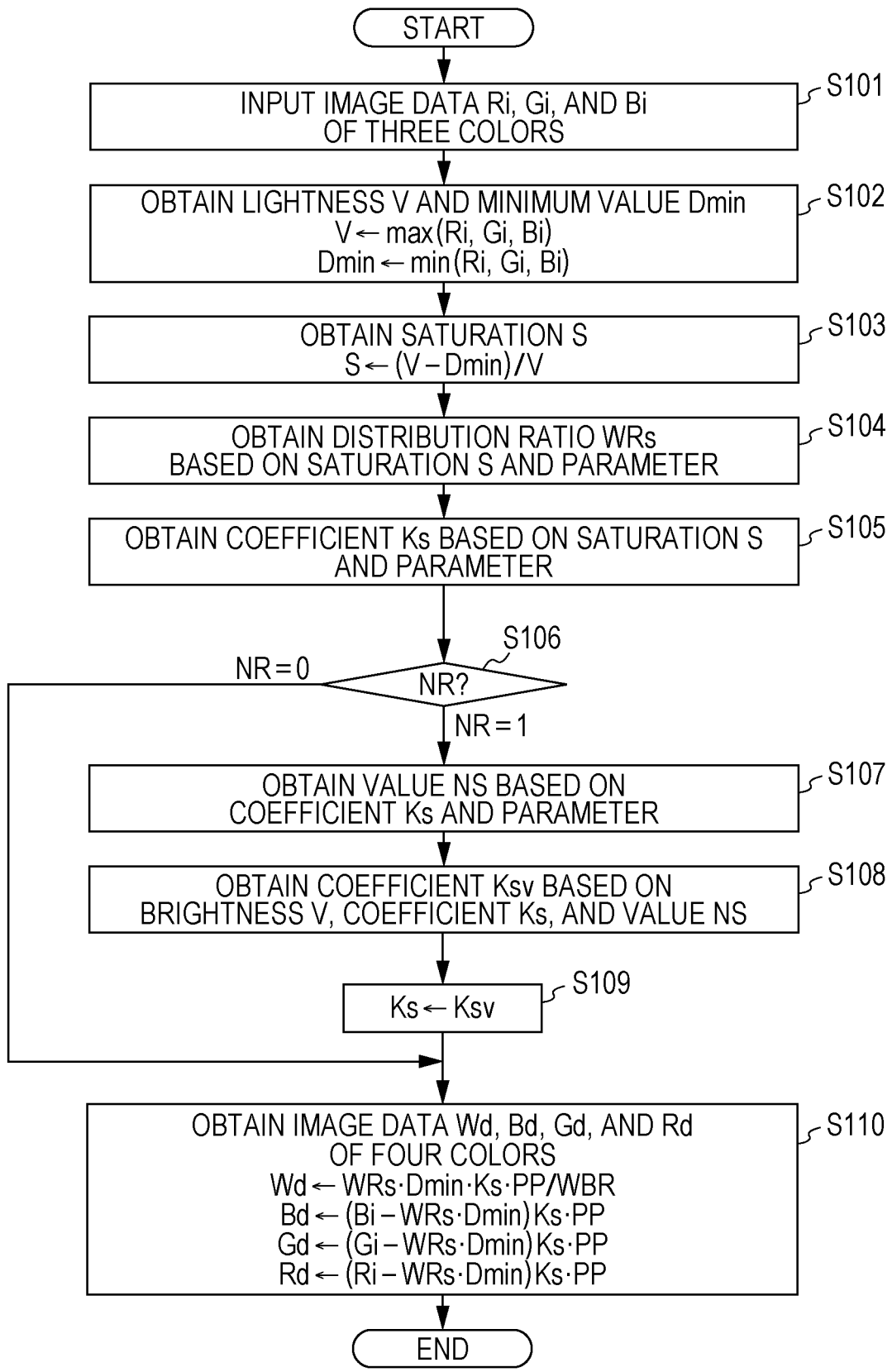
FIG. 3 is a flowchart illustrating image-data conversion processing of the image display device according to the first embodiment.

FIG. 3 is a flowchart illustrating image-data conversion processing. The processing illustrated in FIG. 3 is performed on data of each pixel, which is included in input image data D1. Processing on image data Ri, Gi, and Bi of three colors will be described below on the assumption that red image data, green image data, and blue image data of a pixel, which are included in input image data D1 are respectively set as Ri, Gi, and Bi, and white image data, blue image data, green image data, and red image data of the pixel, which are included in driving image data D2 are respectively set as Wd, Bd, Gd, and Rd.

As illustrated in FIG. 3, the image data Ri, Gi, and Bi of three colors are input to the image data conversion unit 10 (Step S101). Then, the statistical value-and-saturation computation unit 12 obtains the brightness V and the minimum value Dmin of the image data Ri, Gi, and Bi of the three colors (Step S102). Then, the statistical value-and-saturation computation unit 12 obtains a saturation S by the following expression (2), based on the brightness V and the minimum value Dmin (Step S103).

$$S=(V-D\text{min})/V \tag{2}$$

Here, in the expression (2), S is set to 0 when V is 0.

The distribution ratio-and-coefficient computation unit 13 obtains a distribution ratio WRs by a calculation expression (which will be described later), based on the saturation S and the parameters WRX and WBR (Step S104). The distribution ratio-and-coefficient computation unit 13 obtains a coefficient Ks by a calculation expression (which will be described later), based on the saturation S and the parameters WRX, RA, RB, and WBR (Step S105). When the distribution ratio-and-coefficient computation unit obtains the distribution ratio WRs in Step S104, and then obtains the coefficient Ks in Step S105, the distribution ratio-and-coefficient computation unit 13 obtains the maximum value which may be taken by the coefficient Ks with the distribution ratio WRs under a condition in which the brightness V of input image data D1 is set to be the maximum value of 1 which may be taken by the input image data D1.

Then, the distribution ratio-and-coefficient computation unit 13 performs condition branching in accordance with the parameter NR (Step S106). The distribution ratio-and-coefficient computation unit 13 causes the process to proceed to Step S110 at time of NR=0, and to proceed to Step S107 at time of NR=1. In the latter case, the distribution ratio-and-coefficient computation unit 13 obtains a value NS based on the coefficient Ks and the parameter WBR (Step S107), obtains a coefficient Ksv based on the brightness V, the coefficient Ks, and the value NS (Step S108), and sets the coefficient Ksv as the coefficient Ks (Step S109).

The driving image-data operation unit 14 obtains image data Wd, Bd, Gd, and Rd of four colors by the following expressions (3a) to (3d), based on the image data Ri, Gi, and Bi of the three colors, the minimum value Dmin, the distribution ratio WRs, the coefficient Ks, and the parameter WBR (Step S110).

$$Wd=WRs \cdot D\text{min} \cdot Ks \cdot PP/WBR \tag{3a}$$

$$Bd=(Bi-WRs \cdot D\text{min})Ks \cdot PP \tag{3b}$$

$$Gd=(Gi-WRs \cdot D\text{min})Ks \cdot PP \tag{3c}$$

$$Rd=(Ri-WRs \cdot D\text{min})Ks \cdot PP \tag{3d}$$

Here, in the expressions (3a) to (3d), PP indicates a value (P/Pmax) obtained by dividing the maximum value P for image data constraint by the maximum value Pmax (=1) which may be set for the image data. PP is also used in a tone compression method in which the saturation S is not considered. In the following descriptions, PP=1 is assumed. In a case of PP≠1, outputting the maximum luminance when S is 0 is not possible.

The driving image-data operation unit 14 obtains image data Wd, Bd, Gd, and Rd of four colors by using the coefficient Ks obtained in Step S105 when NR is 0, and obtains the image data Wd, Bd, Gd, and Rd of the four colors by using the coefficient Ksv obtained in Step S108 when NR is 1. As described above, the image data conversion unit 10 does not perform low-luminance-portion noise handling processing when NR is 0, and performs low-luminance-portion noise handling processing when NR is 1.

Details of Steps S104 and S105 will be described below. The saturation S and the distribution ratio WRs take values of 0 to 1. The maximum value of blue image data Bd, green image data Gd, and red image data Rd which are included in the driving image data D2 is set as Ddmax, and the minimum value thereof is set as Ddmin. When PP is 1, Wd, Ddmax, and Ddmin are given by the following expressions (4a) to (4c), respectively.

$$Wd=WRs \cdot D\text{min} \cdot Ks/WBR \tag{4a}$$

$$Dd\text{max}=(V-WRs \cdot D\text{min})Ks \tag{4b}$$

$$Dd\text{min}=(D\text{min}-WRs \cdot D\text{min})Ks \tag{4c}$$

The following expression (5a) is derived by solving the expression of Wd>Ddmax in consideration of V=Dmin/(1−S). The following expression (5b) is derived by solving the expression of Wd<Ddmin.

$$WRs>WBRo/(1-S) \tag{5a}$$

$$WRs<WBRo \tag{5b}$$

Here, in the expressions (5a) and (5b), WBRo satisfies WBR/(1+WBR).

Figure 4:
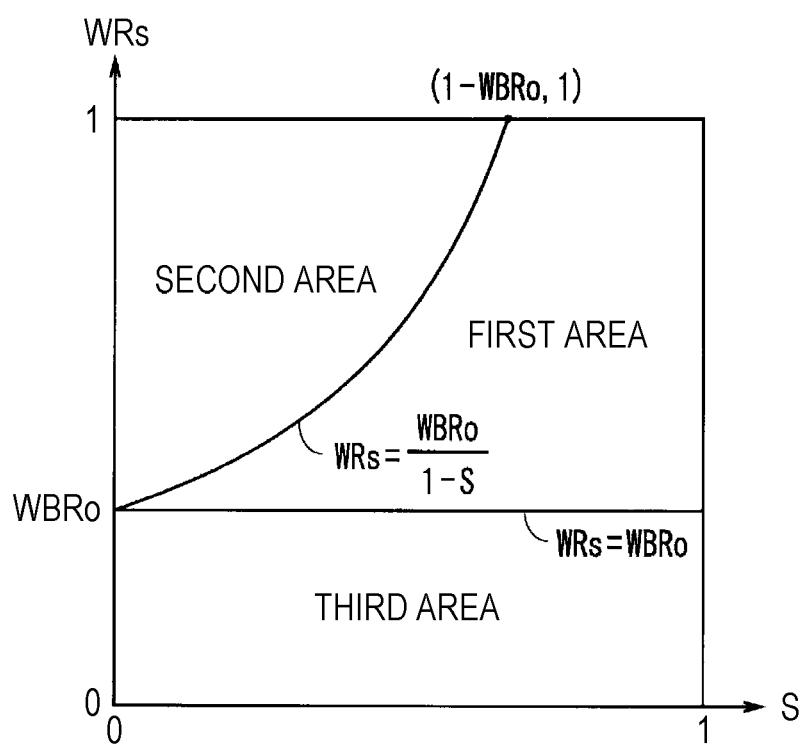
FIG. 4 is a diagram illustrating a range of a saturation and a distribution ratio in the image display device according to the first embodiment.

FIG. 4 is a diagram illustrating a range of the saturation S and the distribution ratio WRs. The range of (S, WRs) illustrated in FIG. 4 is divided into a first area in which Ddmin<Wd<Ddmax is satisfied, a second area in which Ddmax<Wd is satisfied, and a third area in which Wd<Ddmin is satisfied.

In a case where (S, WRs) is in the first area, DDmin is Ddmin, and DDmax is Ddmax. If the expression (1) is solved by substituting Dmin=V(1−S) into the expression (1), the following expression (6) is obtained.

$$Ks \leq RB/(V \times [1-\{WRs(1-RA)+RA\}(1-S)]) \tag{6}$$

The coefficient Ks is determined as with the following expression (7) so as to establish the expression (6) even when the brightness V is 1 (maximum value which may be taken by the input image data D1). The expression (7) shows the maximum value which may be taken by the coefficient Ks under a condition of V=1, in a case where (S, WRs) is in the first area.

$$Ks=RB/[1-\{WRs(1-RA)+RA\}(1-S)] \tag{7}$$

In a case where the distribution ratio WRs is determined to cause (S, WRs) to be in the first area, the expression of Ddmin<Wd<Ddmax is established, and a difference between image data Wd, Bd, Gd, and Rd of four colors included in the driving image data D2 becomes the minimum (even in a case of the maximum, (Ddmax-Ddmin) is established). In this case, the maximum value which may be taken by the coefficient Ks with the distribution ratio WRs in a condition in which V is 1 is given by the expression (7). As (S, WRs) becomes closer to a boundary line between the first and second areas, the white image data Wd approaches the maximum value Ddmax. As (S, WRs) becomes closer to a boundary line between the first and third areas, the white image data Wd approaches the minimum value Ddmin.

The response rate of the pixel 26 changes depending on the gradation displayed by the pixel 26 (referred to as a display gradation below). In the image display device 1, a case where the response rate of the pixel 26 becomes slower as the display gradation increases, and a case where the response rate of the pixel 26 becomes slower as the display gradation decreases are provided. In the former case, the distribution ratio WRs is determined to cause (S, WRs) to be close to the boundary line between the first and second areas, and the white image data Wd is set to approach the maximum value Ddmax. In the latter case, the distribution ratio WRs is determined to cause (S, WRs) to be close to the boundary line between the first and third areas, and the white image data Wd is set to approach the minimum value Ddmin. As described above, if the white image data Wd is set to approach the maximum value Ddmax or the minimum value Ddmin in accordance with the response characteristics of the pixel 26, the gradation is displayed with the higher response rate. Thus, it is possible to improve color reproduction of the image display device 1 by changing image data of the pixel 26 after conversion, fast in each subframe period.

The distribution ratio-and-coefficient computation unit 13 has a function of obtaining the distribution ratio WRs based on the saturation S and a function of obtaining the coefficient Ks based on the saturation S at time of NR=0. The functions vary depending on the parameters WRX, RA, RB, and WBR stored in the parameter storage unit 11. The distribution ratio-and-coefficient computation unit 13 obtains the distribution ratio WRs by the following expression (8) and obtains the coefficient Ks by the expression (7).

[Expression 1]

$$WRs = \begin{cases} \dfrac{WBRo}{1-S} & \text{(TIME OF } WRX \geq Ts \text{ AND } 1-S \geq WBRx) \\ WRX - \dfrac{WRX(1-S)^2}{3 \cdot WBRx^2} & \text{(TIME OF } WRX \geq Ts \text{ AND } 1-S < WBRx) \\ (WBRo - WRX)(1-S)^2 + WRX & \text{(TIME OF } WRX < Ts) \end{cases} \quad (8)$$

Here, in the expression (7), the expressions of WBRo= WBR/(1+WBR), Ts=3WBRo/2, and WBRx=3WBR/{2WRX(1+WBR)} are satisfied. The parameters RA, RB, and WBR take values in ranges of 0≤RA≤51, 0≤RB≤1, and 0≤WBR≤1, respectively. The parameter WRX takes a value in a range of WBRo≤WRX≤1. In the following descriptions, RB=1-RA is set. Here, the function of obtaining the coefficient Ks is shown by using the distribution ratio WRs. However, since the distribution ratio WRs is obtained based on the saturation S, the function of obtaining the coefficient Ks is a function based on the saturation S.

Figure 5:
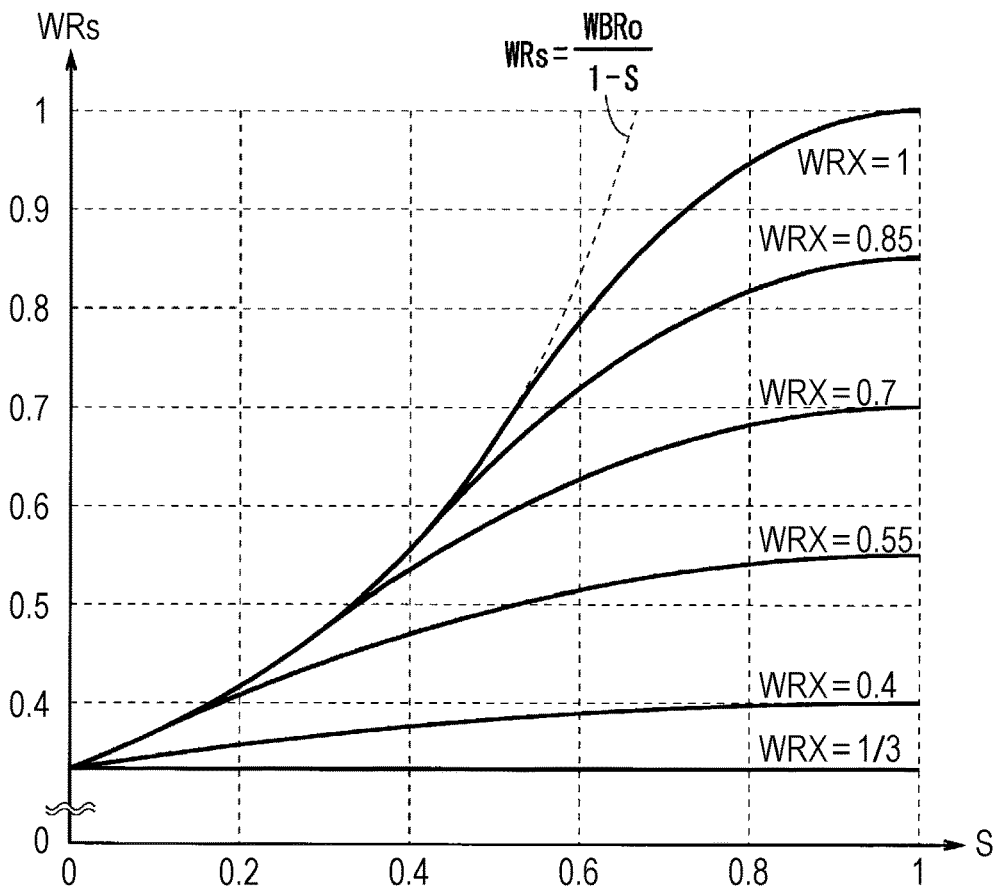
FIG. 5 is a diagram illustrating a graph of the distribution ratio in the image display device according to the first embodiment.
Figure 6:
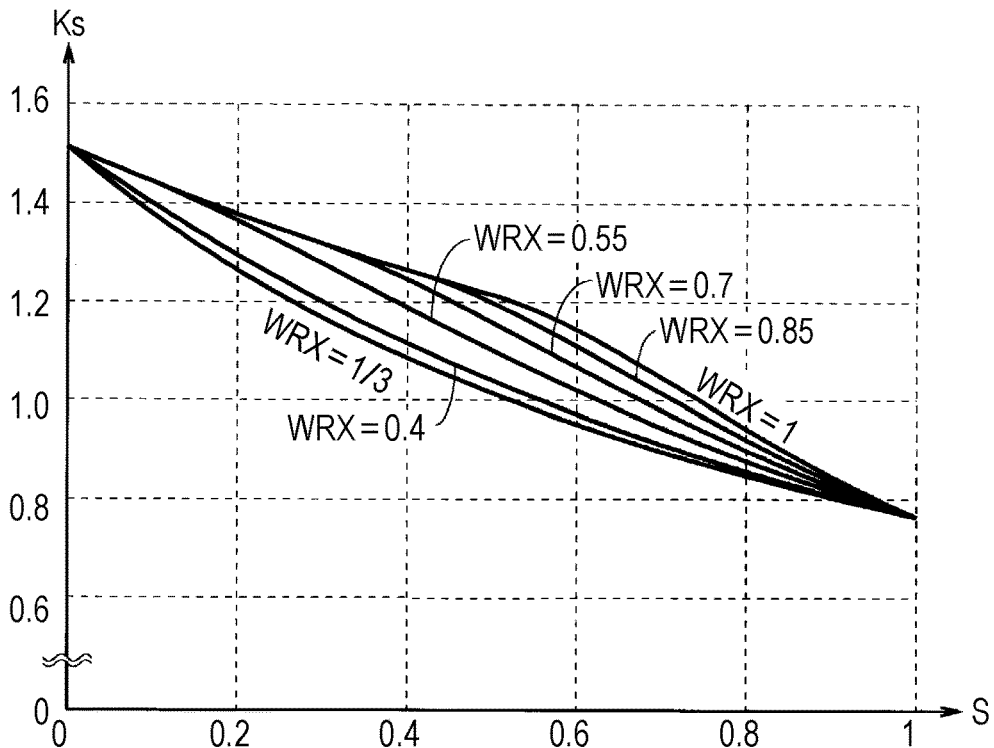
FIG. 6 is a diagram illustrating a graph of a coefficient Ks in the image display device according to the first embodiment.

FIG. 5 is a diagram illustrating a graph of the distribution ratio WRs. FIG. 6 is a diagram illustrating a graph of the coefficient Ks when NR is 0. Here, RA=0.25, RB=0.75, and WBR=0.5 are set. At time of WRX<Ts, the function of obtaining the distribution ratio WRs is a quadratic function which takes a value WBRo when S is 0, and takes the maximum value WRX when S is 1. At time of WRX≥Ts, the function of obtaining the distribution ratio WRs is a fractional function of WRs=WBRo/(1-S) in a case of 1-S≥WBRx, and the function is a quadratic function which has the maximum value WRX at time of S=1 in a case of 1-S<WBRx. The latter function is determined such that the graph of the former function comes into contact with the graph of the latter function at a point (1-WBRx, 2WRX/3). The graph illustrated in FIG. 5 is normally provided in the first area. Since the maximum value which may be taken by the coefficient Ks is obtained by using the distribution ratio WRs under a condition of V=1, the coefficient Ks is obtained by the expression (7). Since the distribution ratio WRs and the coefficient Ks are obtained by the above-described method, it is possible to obtain the maximum coefficient Ks to be permitted, while the difference between the image data Wd, Bd, Gd, and Rd of four colors is made to be the minimum.

In a case where the response rate of the pixel 26 becomes slower as the display gradation increases, the parameter WRX is set to have a value close to 1, and the white image data Wd is set to approach the maximum value Ddmax. In a case where the response rate of the pixel 26 becomes slower as the display gradation decreases, the parameter WRX is set to have a value close to WBRo, and the white image data Wd is set to approach the minimum value Ddmin. As described above, if the parameter WRX is set in accordance with the response characteristics of the pixel 26, it is possible to improve color reproduction of the image display device 1 by displaying the gradation with the higher response rate.

The function of obtaining the distribution ratio WRs and the function of obtaining the coefficient Ks smoothly change in a range of 0≤S≤1. Thus, it is possible to prevent distortion of an image when a gradation image is displayed.

Next, details of Steps S107 and S108 will be described. When NR is 1, the distribution ratio-and-coefficient computation unit 13 obtains the value NS by the following expression (9) in Step S107 and obtains the coefficient Ksv by the following expression (10) in Step S108.

[Expression 2]

$$NS = NB - \dfrac{NB\{Ks - (1+WBR)\}^2}{(1+WBR)^2} \quad (9)$$

$$Ksv = (Ks - NS)V + NS \quad (10)$$

Here, in the expression (9), NB satisfies (1+WBR)2/{2(1+WBR)-1}.

If the expression (9) is substituted with the expression (10), a calculation expression (referred to as Expression E below) of obtaining the coefficient Ksv based on the brightness V, the coefficient Ks, and the parameter WBR is obtained. If V is set to 0 in Expression E, the function of obtaining the coefficient Ksv when V is 0 is obtained. Similarly, if V is set to 1 in Expression E, the function of obtaining the coefficient Ksv when V is 1 is obtained. If V is set to Vx (here, 0<Vx<1) in Expression E, the function of obtaining the coefficient Ksv when V is Vx is obtained. The coefficient Ksv at time of V=0 is equal to the value NS (Ksv=NS), and the coefficient Ksv at time of V=1 is equal to the coefficient Ks (Ksv=Ks). The coefficient Ksv at time of V=Vx has a value obtained by dividing the coefficient Ks and the value NS at a ratio of (1-Vx):Vx.

Figure 7:
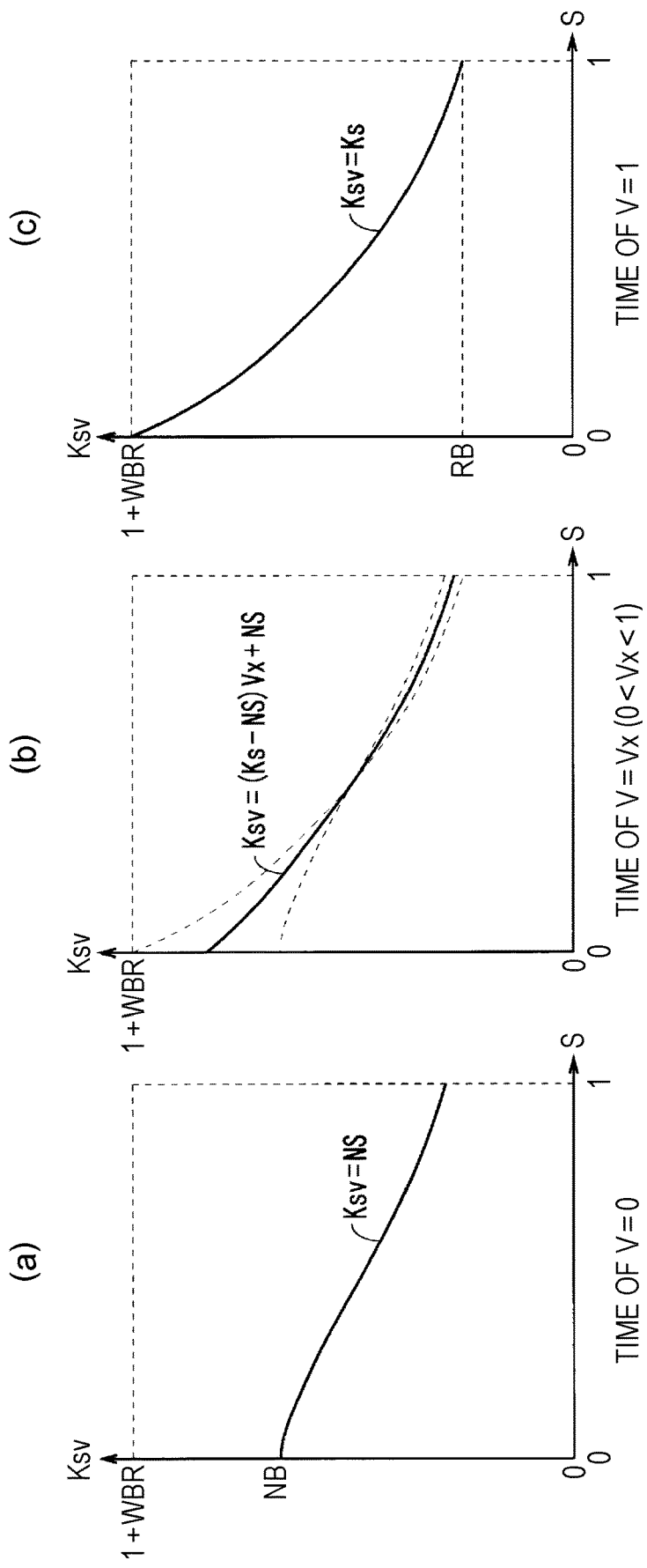
FIG. 7 is a diagram illustrating a graph of a coefficient Ksv in the image display device according to the first embodiment.

FIG. 7 is a diagram illustrating a graph of the coefficient Ksv. FIGS. 7(a) to 7(c) illustrate graphs at time of V=0, V=Vx, and V=1, respectively. As illustrated in FIG. 7, when the brightness V is set to any value, the coefficient Ksv decreases as the saturation S becomes greater, regardless of the value of the brightness V. Therefore, the coefficient Ksv becomes the maximum at time of S=0, and becomes the minimum at time of S=1. The difference between the minimum value and the maximum value of the coefficient Ksv at time of V=0 is smaller than the difference between the minimum value and the maximum value of the coefficient Ksv at time of V=1. The difference between the minimum value and the maximum value of the coefficient Ksv decrease as the brightness V becomes smaller.

As described above, since the difference between the minimum value and the maximum value of the coefficient Ksv decreases as the brightness V becomes smaller, the amount of the coefficient Ksv changing with respect to the amount of the saturation S changing is small when the brightness V is small. Thus, if low-luminance-portion noise handling processing is performed, it is possible to prevent an occurrence of a situation in which the color of a pixel largely changes between the pixel and the adjacent pixel when the luminance is low, and to suppress the occurrence of noise at a low-luminance portion of a display image.

In the image display device 1, if the saturation S and the hue H are the same, it is necessary that the luminance of a pixel 26 increases as the input image data D1 becomes greater (that is, gradation properties are held). In order to hold the gradation properties, if the saturation S is the same, it is necessary that a result obtained by performing amplification and compression processing on the brightness V increases as the brightness V of the input image data D1 becomes greater. Thus, at least, it is necessary that a result obtained by multiplying the brightness V by the coefficient Ksv at time of 0<V<1 is smaller than a result obtained by multiplying the brightness V(=1) by the coefficient Ksv (=Ks) at time of V=1. With the expression of Ksv·V≤Ks, the following expression (11) is obtained.

$$Ksv \leq Ks/V \quad (11)$$

Figure 8:
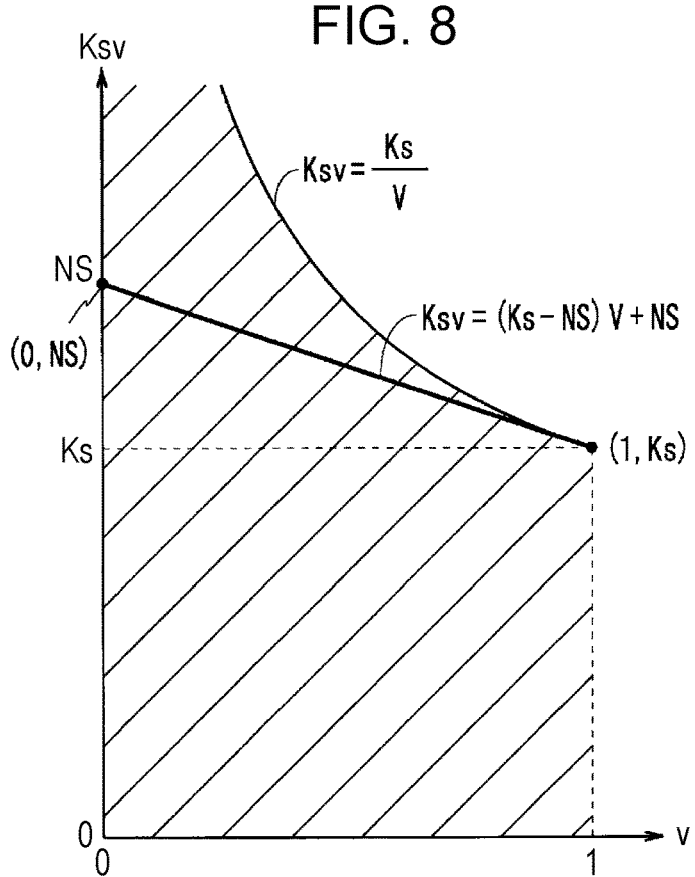
FIG. 8 is a diagram illustrating a range of the coefficient Ksv satisfying a condition in the image display device according to the first embodiment.

A range satisfying the expression (11) corresponds to a shaded area illustrated in FIG. 8. The function of obtaining the coefficient Ksv based on the brightness V is determined such that the graph of the function is in the shaded area illustrated in FIG. 8. As described above, the distribution ratio-and-coefficient computation unit 13 obtains the coefficient Ksv by the expression (10). As illustrated in FIG. 8, the graph of the coefficient Ksv passes through two points (0, NS) and (1, Ks).

Figure 9:
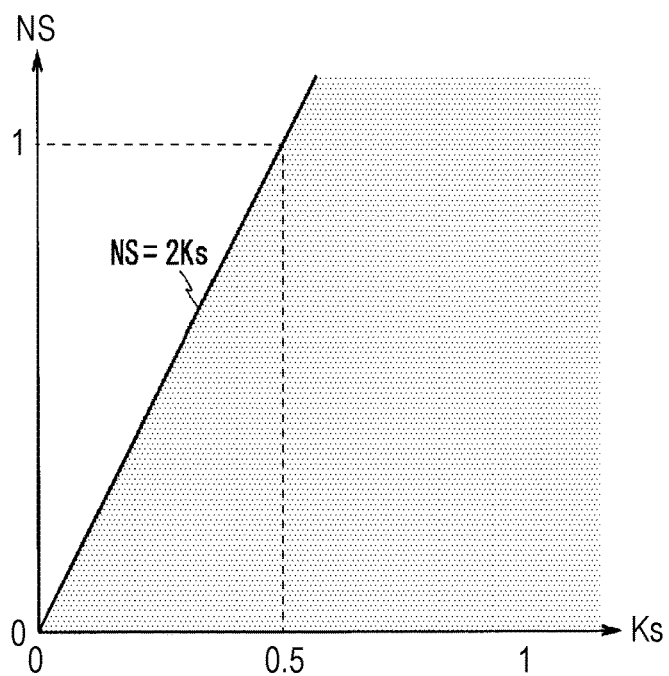
FIG. 9 is a diagram illustrating a range of a value NS satisfying a condition in the image display device according to the first embodiment.

In order to cause an inequation obtained by substituting the expression (10) with the expression (11) to be established in a range of 0<V<1, the slope of a straight line shown by the expression (10) may be equal to or greater than the slope of a tangent line at a point (1, Ks) of the function of Ksv=Ks/V. Thus, with the expression of Ks−NS≥−Ks, the following expression (12) is obtained. A range satisfying the expression (12) corresponds to a dot pattern area illustrated in FIG. 9.

$$NS \leq 2Ks \quad (12)$$

Figure 10:
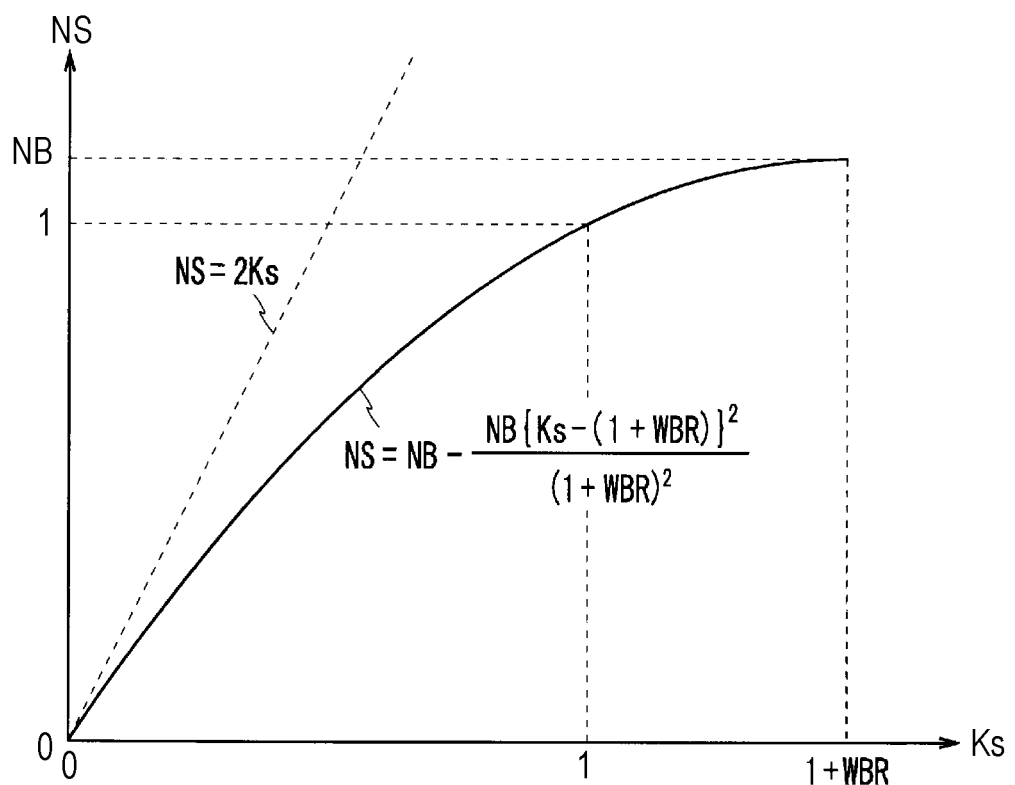
FIG. 10 is a diagram illustrating a graph of the value NS in the image display device according to the first embodiment.

FIG. 10 is a diagram illustrating a graph of the value NS. The graph illustrated in FIG. 10 passes through three points (0, 0), (1, 1), and (1+WBR, NB). The slope of a tangent line at a point (0, 0) of the function of obtaining the value NS satisfies the expression of 2NB/(1+WBR)=(2+2WBR)/(1+2WBR), and is equal to or smaller than 2 in a range of 0≤WBR≤1. Thus, the graph illustrated in FIG. 10 is in the range illustrated in FIG. 9. Accordingly, since the value NS is obtained by the expression (10), if the saturation S and the hue H are the same, the result obtained by performing amplification and compression processing on the brightness V increases as the brightness V of the input image data D1 becomes greater. Thus, in a case where low-luminance-portion noise handling processing is performed, the luminance of a pixel 26 increases as the input image data D1 becomes greater, and thus it is possible to hold the gradation properties.

Figure 11:
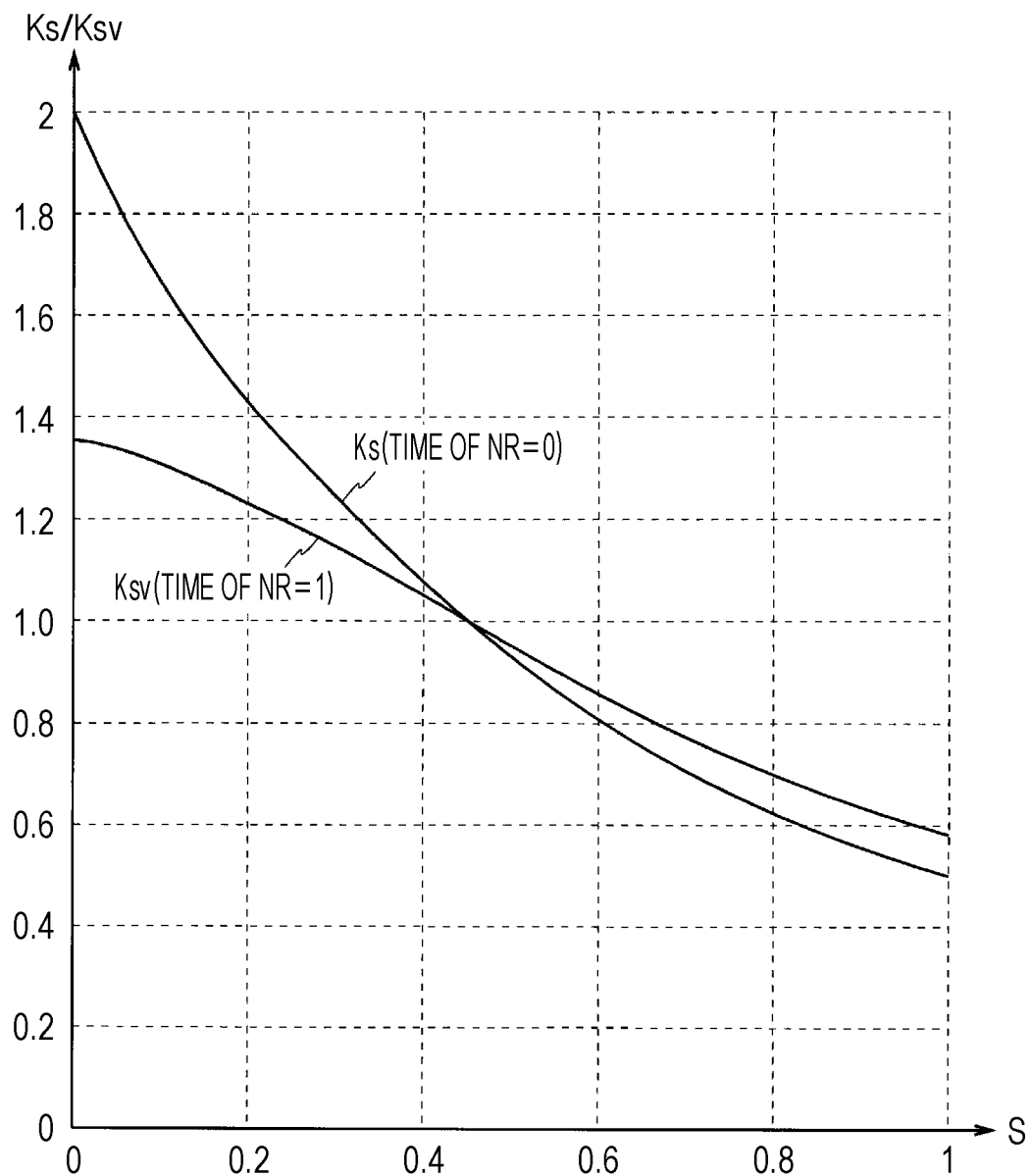
FIG. 11 is a diagram illustrating a graph of the coefficient in the image display device according to the first embodiment.
Figure 12:
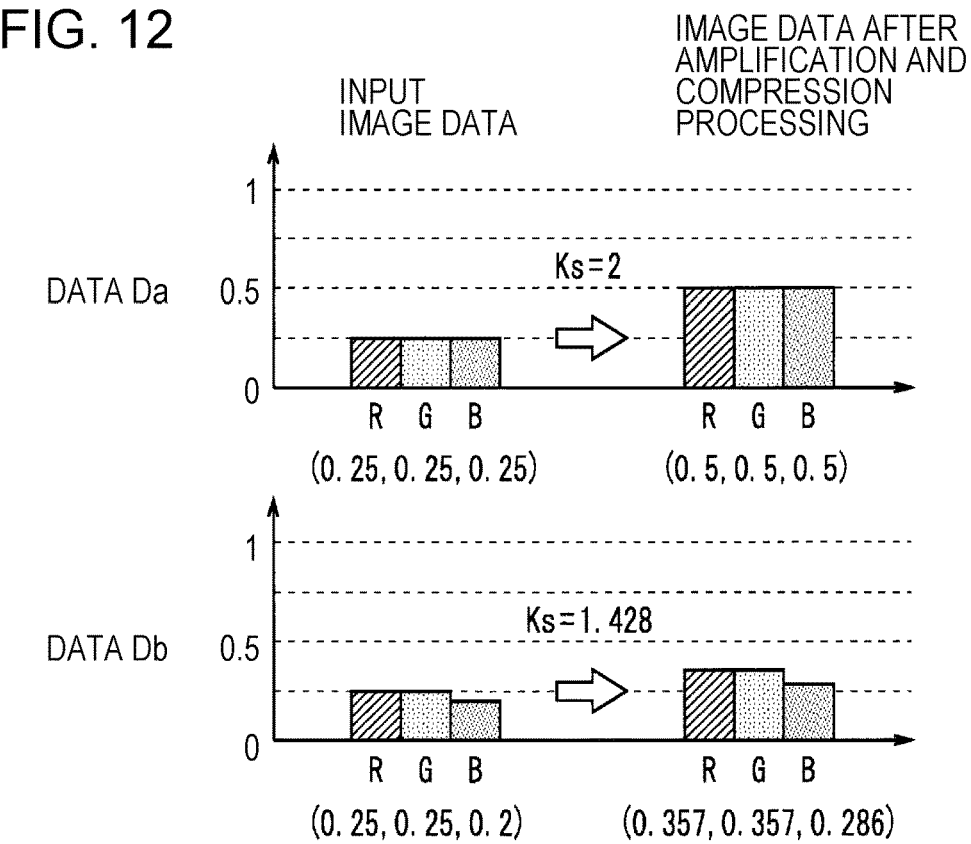
FIG. 12 is a diagram illustrating an example of image-data conversion processing in a case where low-luminance-portion noise handling processing is not performed, in the image display device according to the first embodiment.
Figure 13:
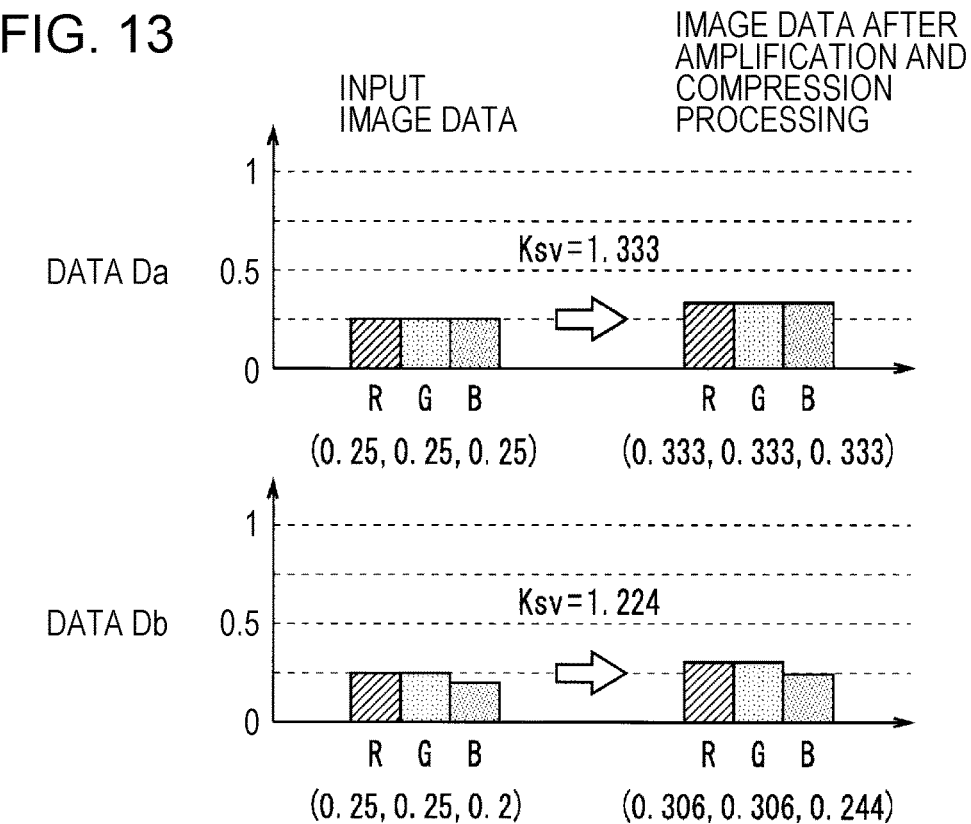
FIG. 13 is a diagram illustrating an example of image-data conversion processing in a case where the low-luminance-portion noise handling processing is performed, in the image display device according to the first embodiment.

The advantageous effects of low-luminance-portion noise handling processing will be described with reference to FIGS. 11 to 13. FIG. 11 is a diagram illustrating a graph of the coefficient in the image display device 1. FIG. 11 illustrates the graph of the coefficient Ks obtained in Step S105 at time of NR=0 and the graph of the coefficient Ksv obtained in Step S108 at time of NR=1. Here, WRX=WBR=1 and RA=RB=0.5 are set. FIG. 12 is a diagram illustrating an example of image-data conversion processing in a case where low-luminance-portion noise handling processing is not performed (at time of NR=0), in the image display device 1. FIG. 13 is a diagram illustrating an example of image-data conversion processing in a case where the low-luminance-portion noise handling processing is performed (at time of NR=1), in the image display device 1.

Here, as an example, a case where red image data, green image data, and blue image data which are included in input image data D1 corresponds to (0.25, 0.25, 0.25) and a case where the red image data, green image data, and blue image data corresponds to (0.25, 0.25, 0.2) are considered (the former is referred to as data Da below, and the latter is referred to as data Db below). Regarding data Da, S is 0, and V is 0.25. Regarding data Db, S is 0.2, and V is 0.25.

When NR is 0, and S is 0, Ks is 2. When NR is 0, and S is 0.2, Ks is 1.428 (see FIG. 11). Thus, in a case where low-luminance-portion noise handling processing is not performed (FIG. 12), amplification and compression processing of multiplying the data Da by Ks=2 is performed, and image data after the amplification and compression processing corresponds to (0.5, 0.5, 0.5). Amplification and compression processing of multiplying the data Db by Ks=1.428 is performed, and image data after the amplification and compression processing corresponds to (0.357, 0.357, 0.286). A difference between the data Da and the data Db is small. However, in a case where the low-luminance-portion noise handling processing is not performed, a large difference occurs between a result obtained by performing amplification and compression processing on the data Da and a result obtained by performing amplification and compression processing on the data Db.

When NR is 1, and S is 0, Ks is 1.333. When NR is 1, and S is 0.2, Ks is 1.224 (see FIG. 11). Thus, in a case where low-luminance-portion noise handling processing is performed (FIG. 13), amplification and compression processing of multiplying the data Da by Ks=1.333 is performed, and image data after the amplification and compression processing corresponds to (0.333, 0.333, 0.333). Amplification and compression processing of multiplying the data Db by Ks=1.224 is performed, and image data after the amplification and compression processing corresponds to (0.306, 0.306, 0.245). In a case where the low-luminance-portion noise handling processing is performed, the difference between the result obtained by performing amplification and compression processing on the data Da and the result obtained by performing amplification and compression processing on the data Db is smaller than that in a case where the low-luminance-portion noise handling processing is not performed.

It is assumed that a pixel driven based on the data Da is adjacent to a pixel driven based on the data Db. In a case where the low-luminance-portion noise handling processing is not performed, the difference of the color between the two pixels is large, and thus noise occurs at a low-luminance portion of a display image. Since the low-luminance-portion noise handling processing is performed, the difference of the color between the two pixels is reduced, and thus it is possible to suppress the occurrence of noise at the low-luminance portion of the display image.

As described above, in Step S110, the driving image-data operation unit 14 obtains image data Wd, Bd, Gd, and Rd of the four colors by the expressions (3a) to (3d), based on the image data Ri, Gi, and Bi of the three colors, the minimum value Dmin, the distribution ratio WRs, the coefficient Ks, and the parameter WBR. Here, a color shown by the image data Ri, Gi, or Bi of the three colors is referred to as a color before conversion, and a color shown by the image data Wd, Bd, Gd, or Rd of the four colors is referred to as colors after conversion. When the two colors are expressed in an HSV color space, brightness V is different between the two colors, the hue H is the same between the two colors, and the saturation S is the same between the two colors. As described above, in image-data conversion processing in the image data conversion unit 10, for each pixel, the hue H holds the same value and the saturation S holds the same value in the HSV color space, between the input image data D1 and the driving image data D2.

As described above, the image display device 1 according to the embodiment is a field sequential type image display device which includes the image data conversion unit 10 that obtains driving image data D2 corresponding to a plurality of subframes (white, blue, green, and red subframes) including a common color subframe (white subframe), based on input image data D1 corresponding to a plurality of color components (red, green, and blue), and the display unit 20 that displays the plurality of subframes based on the driving image data D2, in one frame period. The image data conversion unit 10 performs conversion processing (image-data conversion processing) of converting first image data (input image data D1) corresponding to a plurality of color components into second image data (driving image data D2) corresponding to a plurality of subframes, for each pixel 26. In the conversion processing, for each pixel 26, the hue H and the saturation S of the first image data and the hue H and the saturation S of the second image data in the HSV color space are held to be respectively equal to each other. The image data conversion unit 10 computes a coefficient Ks used in the conversion processing, and performs the conversion processing using the coefficient Ks. The coefficient Ks varies depending on a brightness V and has a value causing a brightness after the conversion processing to increase as the brightness V becomes greater if the saturations S are equal to each other. As the brightness V becomes smaller, the difference between the minimum value of the coefficient (coefficient Ks at time of S=1) and the maximum value thereof (coefficient Ks at time of S=0) decreases.

As described above, since the coefficient Ks is obtained to vary depending on the brightness V and to have a value causing a brightness after the amplification and compression processing to increase as the brightness V becomes greater if the saturation S is the same. Thus, it is possible to hold the gradation properties. It is possible to suppress the occurrence of noise at a low-luminance portion of a display image by reducing the amount of the coefficient Ks changing with respect to the amount of the saturation S changing, when the brightness V is small. Thus, according to the image display device 1 according to the embodiment, it is possible to suppress the occurrence of noise at a low-luminance portion of a display image while gradation properties are held.

The image data conversion unit 10 obtains the distribution ratio WRs indicating a value distributed to a common color subframe and the coefficient Ks used in amplification and compression processing, performs conversion processing using the distribution ratio WRs and the coefficient Ks. The image data conversion unit obtains the distribution ratio WRs based on the saturation S for each pixel such that second image data corresponding to the common color subframe is in a range of the minimum value of the second image data corresponding to other subframes to the maximum value thereof. Thus, it is possible to suppress a change of the image data after the conversion, in one frame period, and to improve color reproduction of the image display device. The image data conversion unit 10 obtains the distribution ratio WRs and the coefficient Ks by the functions which smoothly changes depending on the saturation S. Thus, it is possible to prevent distortion of an image when a gradation image is displayed.

In the conversion processing in the image data conversion unit 10, the range of the maximum value of the second image data in one frame period is determined in accordance with the minimum value of the second image data in one frame period. Thus, it is possible to suppress a change of the image data after the conversion, in one frame period, and to improve color reproduction of the image display device. The image data conversion unit 10 obtains the distribution ratio WRs increasing as the saturation S becomes greater, for each pixel. Thus, it is possible to suppress an occurrence of color breakup by increasing a ratio of a value distributed to a common color subframe as the saturation S becomes greater. The display unit 20 includes the light source 27, and controls the luminance of the light source 27 when displaying a common color subframe. Thus, according to the image display device 1, it is possible to reduce heat generated by the light source 27.

The image data conversion unit 10 includes the parameter storage unit 11 that stores a parameter used in the conversion processing. The parameter storage unit 11 stores the first parameter (parameter WRX) in accordance with the response characteristics of a pixel 26 provided in the display unit 20. Thus, it is possible to improve color reproduction by setting a suitable first parameter in accordance with the response characteristics of the display unit 20.

The parameter storage unit 11 stores the second parameters (parameters RA and RB) in addition to the first parameter (parameter WRX). The second parameters are provided for designating the range of the maximum value DDmax of the second image data in one frame period in accordance with the minimum value DDmin of the second image data in one frame period. Since the suitable first parameter is set in accordance with the response characteristics of the display unit 20 and the maximum value DDmax of the driving image data D2 in one frame period is limited in accordance with the minimum value DDmin of the driving image data D2 in one frame period by using the second parameter, it is possible to improve color reproduction.

The parameter storage unit 11 stores the third parameter (parameter WBR) in addition to the first parameter (parameter WRX) and the second parameter (parameters RA and RB). The third parameter is provided for designating the luminance of the light source 27 provided in the display unit 20 when a common color subframe (white subframe) is displayed. The display unit 20 controls the luminance of the light source 27 in accordance with the third parameter, when displaying the common color subframe. Thus, according to the image display device 1, it is possible to improve color reproduction by using the first and second parameters, and to reduce heat generated by the light source 27 by controlling the luminance of the light source 27 of when a common color subframe is displayed, with the third parameter.

The image data conversion unit 10 performs the conversion processing on normalized luminance data (input image data D1). Thus, it is possible to accurately perform the conversion processing. The input image data D1 corresponds to the red, green, and blue colors. The driving image data D2 corresponds to red, green, blue, and white subframes. The common color subframe is a white subframe. Thus, in the image display device that displays subframes of three primary colors and the white color based on input image data D1 corresponding to the three primary colors, it is possible to suppress the occurrence of noise at a low-luminance portion of a display image while the gradation properties are held.

Second Embodiment

An image display device according to a second embodiment has the same configuration as the image display device 1 according to the first embodiment (see FIG. 1). The image display device according to the embodiment has a function of obtaining the value NS by a calculation expression other than the expression (9) when low-luminance-portion noise handling processing is performed. Differences from the first embodiment will be described below.

In the embodiment, the parameter NR takes any value of 0, 1, 2, and 3. The value of 0 indicates that low-luminance-portion noise handling processing is not performed. The values of 1 to 3 indicate that the low-luminance-portion noise handling processing is performed by first to third methods, respectively.

Figure 14:
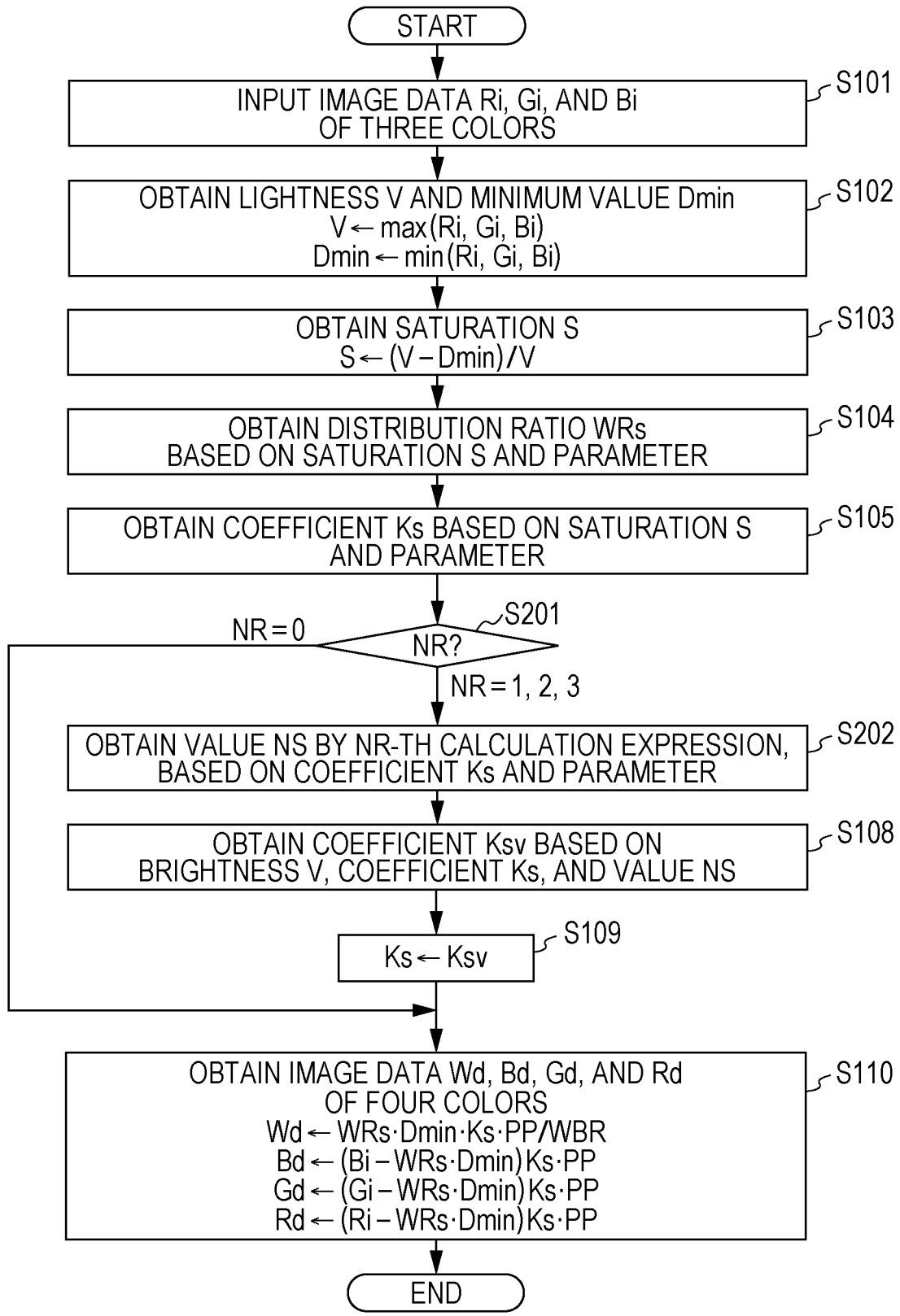
FIG. 14 is a flowchart illustrating image-data conversion processing of an image display device according to a second embodiment.

FIG. 14 is a flowchart illustrating image-data conversion processing according to the embodiment. The flowchart illustrated in FIG. 14 is obtained by respectively replacing Steps S106 and S107 in the flowchart illustrated in FIG. 3 with Steps S201 and S202.

In Step S101 to S105, the image data conversion unit 10 operates in a manner similar to the first embodiment. Then, the distribution ratio-and-coefficient computation unit 13 performs condition branching in accordance with the parameter NR (Step S201). The distribution ratio-and-coefficient computation unit 13 causes the process to proceed to Step S110 at time of NR=0, and to proceed to Step S201 at time of NR=1, 2, or 3. In the latter case, the distribution ratio-and-coefficient computation unit 13 obtains the value NS by the NR-th calculation expression, based on the coefficient Ks and the parameters WBR and NR (Step S202). Specifically, the distribution ratio-and-coefficient computation unit 13 obtains the value NS by the expression (9) at time of NR=1, obtains the value NS by the following expression (13) at time of NR=2, and obtains the value NS by the following expression (14) at time of NR=3.

[Expression 3]

$$NS = \begin{cases} 1 - (Ks - 1)^2 & \text{(TIME OF } Ks \leq 1) \\ 1 & \text{(TIME OF } Ks > 1) \end{cases} \quad (13)$$

$$NS = \begin{cases} 0.75 - \dfrac{(Ks - 0.75)^2}{0.75} & \text{(TIME OF } Ks \leq 0.75) \\ 0.75 & \text{(TIME OF } Ks > 0.75) \end{cases} \quad (14)$$

Figure 15:
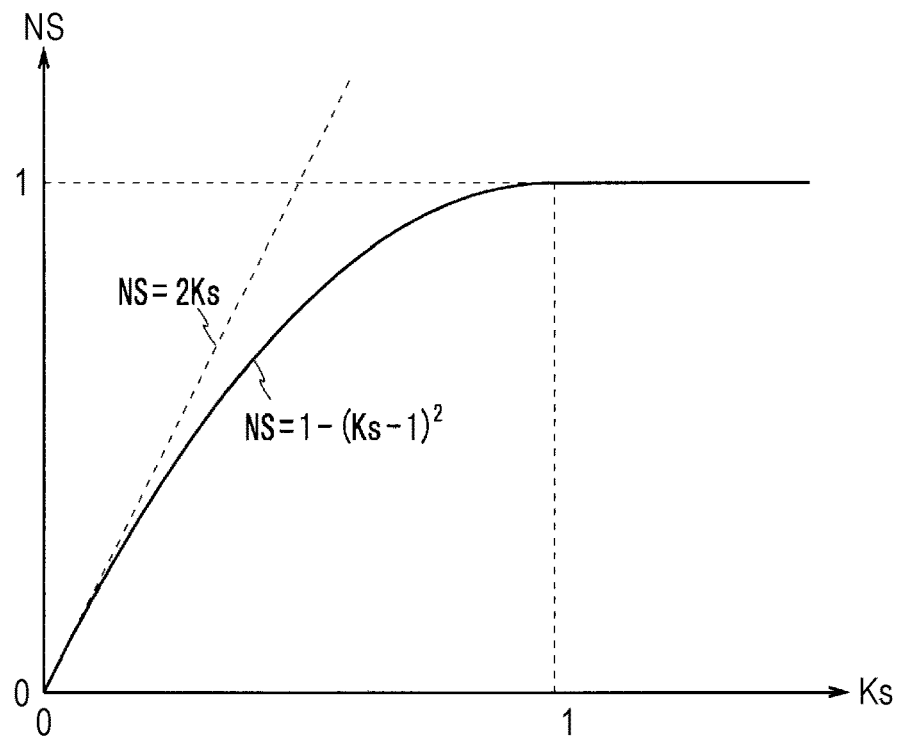
FIG. 15 is a diagram illustrating a graph of a value NS by a second calculation expression in the image display device according to the second embodiment.
Figure 16:
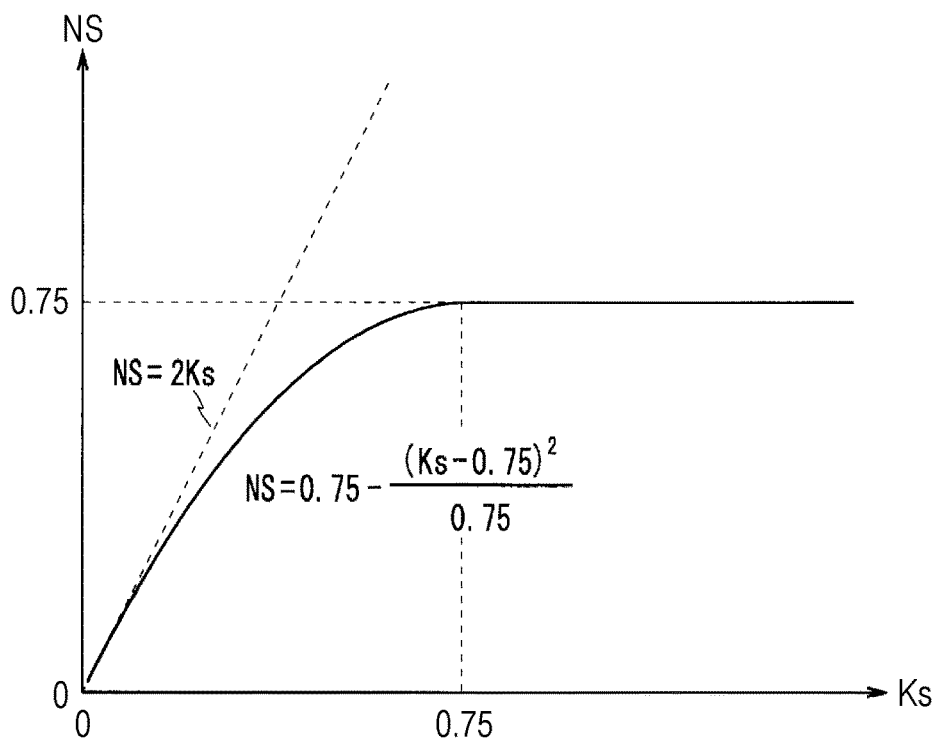
FIG. 16 is a diagram illustrating a graph of the value NS by a third calculation expression in the image display device according to the second embodiment.

The graph of the value NS at time of NR=1 is as illustrated in FIG. 10. FIG. 15 is a diagram illustrating a graph of the value NS when NR is 2. FIG. 16 is a diagram illustrating a graph of the value NS when NR is 3. The graph illustrated in FIG. 15 passes through two points (0, 0) and (1, 1). The graph illustrated in FIG. 16 passes through two points (0, 0) and (0.75, 0.75). Any of the graphs illustrated in FIGS. 15 and 16 is in contact with the graph of the function of NS=2Ks at the point (0, 0). Thus, any of the graphs illustrated in FIGS. 15 and 16 is in the range illustrated in FIG. 9.

Here, the following expression (15) is considered as a calculation expression of obtaining the value NS based on the coefficient Ks.

[Expression 4]

$$NS = \begin{cases} NB - \dfrac{NB(Ks - NC)^2}{NC^2} & \text{(TIME OF } Ks \leq NC) \\ NB & \text{(TIME OF } Ks > NC) \end{cases} \quad (15)$$

If NB=(1+WBR)2/{2(1+WBR)−1} and NC=1+WBR are set in the expression (15), the expression (9) is obtained. If NB=NC=1 is set in the expression (15), the expression (13) is obtained. If NB=NC=0.75 is set in the expression (15), the expression (14) is obtained.

According to the image display device according to the embodiment, similar to the first embodiment, it is possible to suppress the occurrence of noise at a low-luminance portion of a display image while gradation properties are held. In the second embodiment, the parameter storage unit 11 stores the parameter NR, and a value included in the expression of obtaining the value NS in accordance with the value of the parameter NR changes. Instead, the parameter storage unit may store values NB and NC as parameters, and the distribution ratio-and-coefficient computation unit may obtain the value Ks by the expression (15).

Third Embodiment

An image display device according to a third embodiment has the same configuration as the image display device 1 according to the first embodiment (see FIG. 1). The image display device according to the embodiment has a function of the coefficient Ksv by a calculation expression other than the expression (10) when low-luminance-portion noise handling processing is performed. Differences from the first and second embodiments will be described.

In the embodiment, the parameter NR takes any value of 0, 1, 2, 3, and 4. The value of 0 indicates that low-luminance-portion noise handling processing is not performed. The values of 1 to 4 indicate that the low-luminance-portion noise handling processing is performed by first to fourth methods, respectively. The parameter storage unit 11 stores a parameter NE in addition to the parameters WRX, RA, RB, WBR, and NR. The parameter NE is included in a calculation expression of obtaining the coefficient Ksv at time of NR=4.

Figure 17:
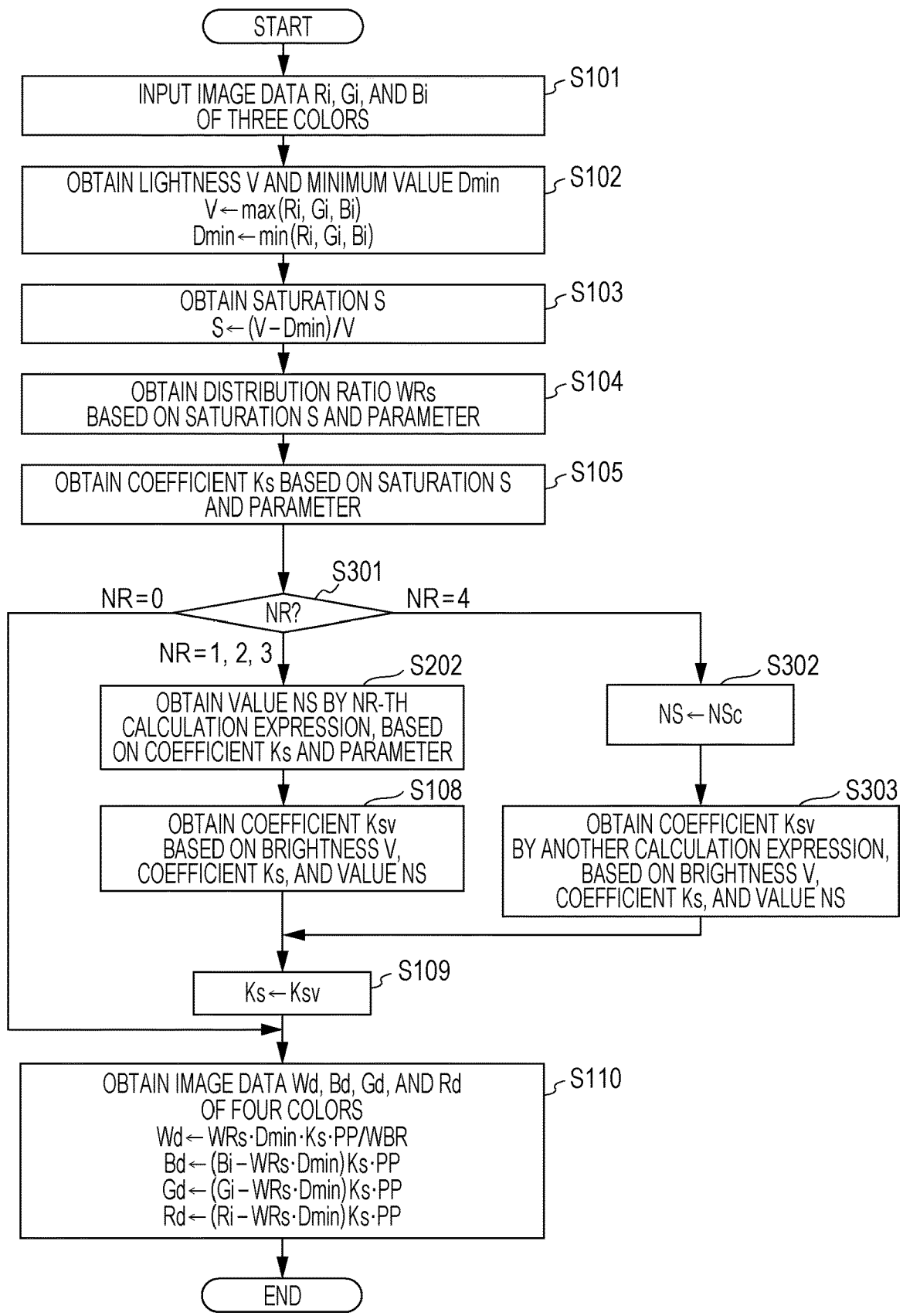
FIG. 17 is a flowchart illustrating image-data conversion processing of an image display device according to a third embodiment.

FIG. 17 is a flowchart illustrating image-data conversion processing according to the embodiment. The flowchart illustrated in FIG. 17 is obtained by replacing Step S201 in the flowchart illustrated in FIG. 14 with Step S301 and adding Steps S302 and S303 to the flowchart illustrated in FIG. 14.

In Step S101 to S105, the image data conversion unit 10 operates in a manner similar to the first and second embodiments. Then, the distribution ratio-and-coefficient computation unit 13 performs condition branching in accordance with the parameter NR (Step S301). The distribution ratio-and-coefficient computation unit 13 causes the process to proceed to Step S110 at time of NR=0, to proceed to Step S201 at time of NR=1, 2, or 3, and to proceed to Step S302 at time of NR=4. When NR is 4, the distribution ratio-and-coefficient computation unit 13 sets the value NS to be a fixed value NSc (Step S302) and obtains the coefficient Ksv by a calculation expression different from that in Step S108 (Step S303). Then, the process proceeds to Step S109. In Step S302, the distribution ratio-and-coefficient computation unit 13 preferably sets the value NS to 1. In Step S303, the distribution ratio-and-coefficient computation unit 13 obtains the coefficient Ksv by the following expression (16).

[Expression 5]

$$Ksv = \begin{cases} \frac{(Ks - NS)V^2}{NE^2(3 - 2NE)} + NS & \text{(TIME OF } V < NE\text{)} \\ \frac{2NE(NS - Ks)}{3 - 2NE}\left(\frac{1}{V} - 1\right) + Ks & \text{(TIME OF } V \geq NE\text{)} \end{cases} \quad (16)$$

Figure 18:
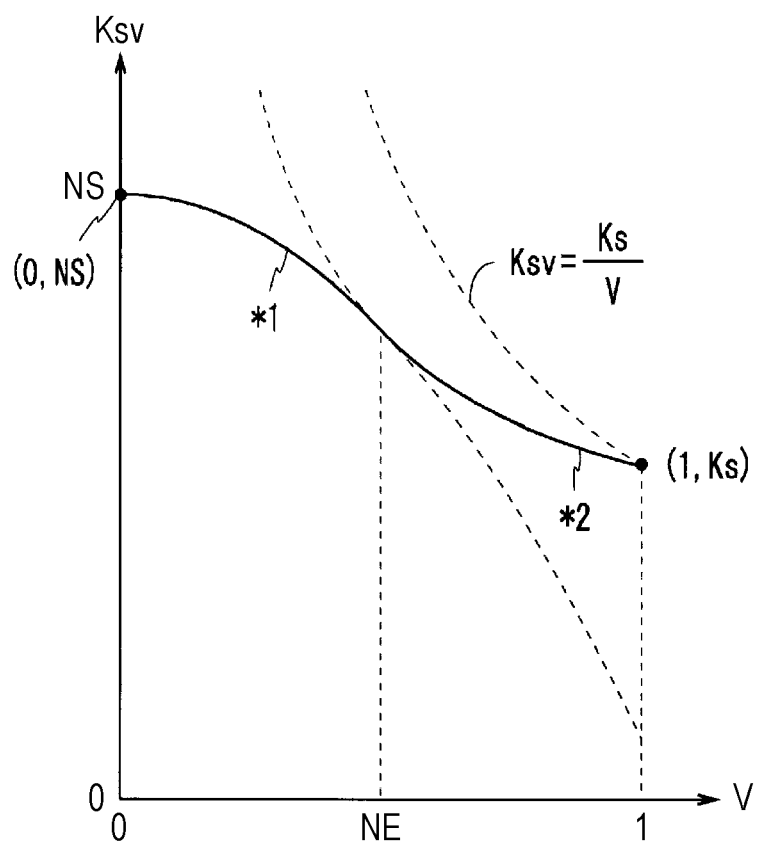
FIG. 18 is a diagram illustrating a graph of the coefficient Ksv by another calculation expression in the image display device according to the third embodiment.

FIG. 18 is a diagram illustrating a graph of the coefficient Ksv when NR is 4. Here, a function of taking the value NS at time of V=0 and taking the value Ks at time of V=1 by using a quadratic function and a fractional function is defined. A function of obtaining the coefficient Ksv at time of V≤NE is a quadratic function of taking the maximum value NS when V is 0. A function of obtaining the coefficient Ksv at time of V>NE is a fractional function of taking the value Ks when V is 1. The expression (16) is obtained by determining the two functions such that the graphs of the two functions are in contact with each other at time of V=NE.

According to the image display device according to the embodiment, similar to the first and second embodiments, it is possible to suppress the occurrence of noise at a low-luminance portion of a display image while gradation properties are held. In the image display device according to the embodiment, in Step S302 at time of NR=4, the distribution ratio-and-coefficient computation unit 13 may perform processing of obtaining the value NS based on the saturation S and the parameter stored in the parameter storage unit 11, instead of the processing of setting the value NS to the fixed value NSc.

Fourth Embodiment

Figure 19:
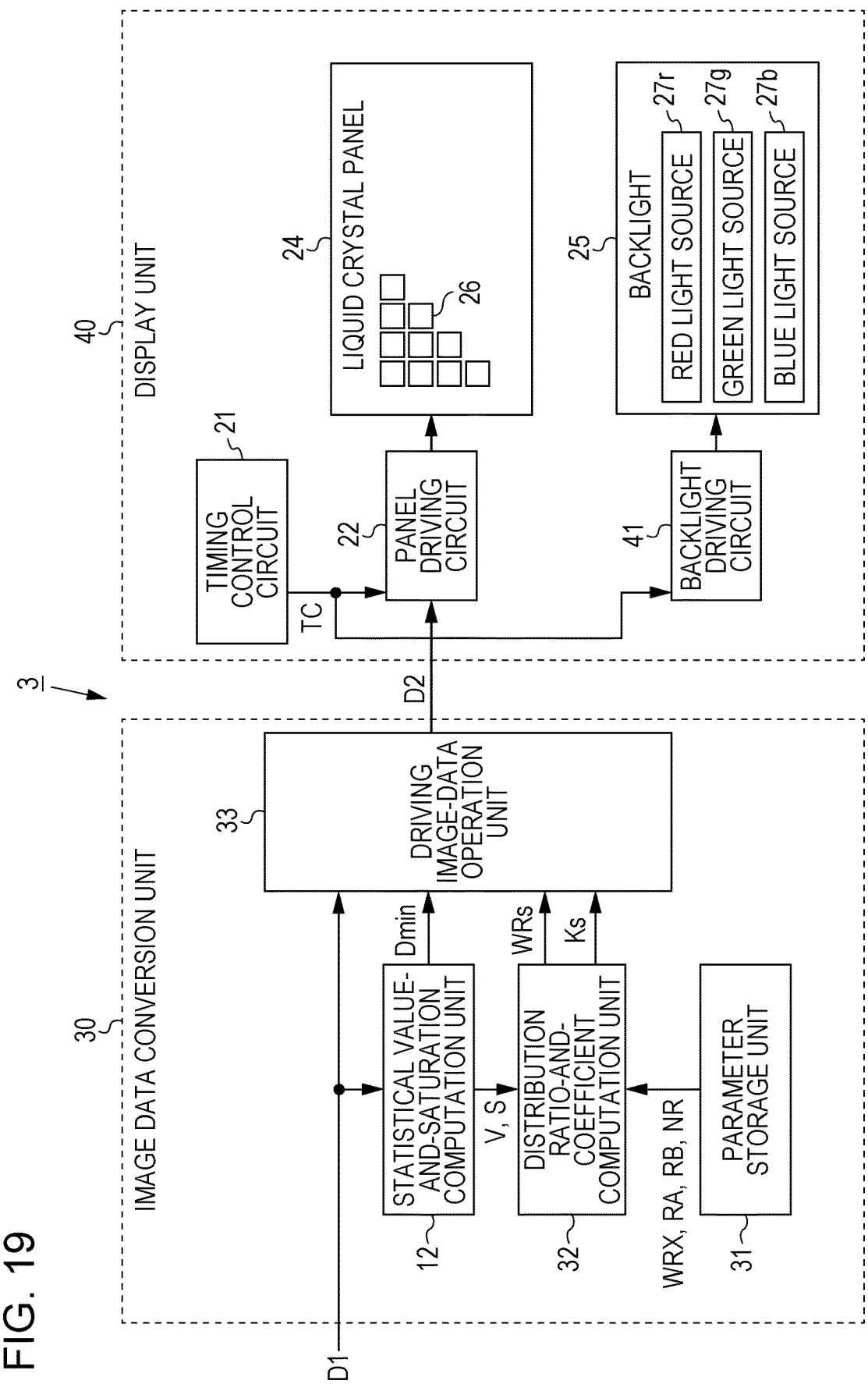
FIG. 19 is a block diagram illustrating a configuration of an image display device according to a fourth embodiment.

FIG. 19 is a block diagram illustrating a configuration of an image display device according to a fourth embodiment. An image display device 3 illustrated in FIG. 19 includes an image data conversion unit 30 and the display unit 40. The image data conversion unit 30 includes a parameter storage unit 31, the statistical value-and-saturation computation unit 12, a distribution ratio-and-coefficient computation unit 32, and a driving image-data operation unit 33. The display unit 40 is obtained by replacing the backlight driving circuit 23 with a backlight driving circuit 41 in the display unit 20 according to the first embodiment.

The image display device 3 operates similar to when WBR is set to 1 in the image display device 1 according to the first embodiment. In the image display device 3, the luminance of the light source 27 provided in the backlight 25 is fixed. The parameter storage unit 31 stores the parameters WRX, RA, RB, and NR used in image-data conversion processing, and does not store the parameter WBR. The distribution ratio-and-coefficient computation unit 32 operates similar to when WBR is set to 1 in the distribution ratio-and-coefficient computation unit 13 according to the first embodiment. The driving image-data operation unit 33 operates similar to when WBR is set to 1 in the driving image-data operation unit 14 according to the first embodiment.

According to the image display device 3 according to the embodiment, regarding a case where the luminance of the light source 27 provided in the backlight 25 is not controlled, similar to the first embodiment, it is possible to suppress the occurrence of noise at a low-luminance portion of a display image while gradation properties are held.

Fifth Embodiment

An image display device according to a fifth embodiment has the same configuration as the image display device 1 according to the first embodiment (see FIG. 1). The image display device according to the embodiment selectively performs high-luminance-portion noise handling processing in addition to the low-luminance-portion noise handling processing. In the image display device according to the embodiment, the parameter storage unit 11 stores parameters GL and RC in addition to the parameters WRX, RA, RB, WBR, and NR. When performing high-luminance-portion noise handling processing, the distribution ratio-and-coefficient computation unit 13 obtains the coefficient Ks by a calculation expression different from that in the first embodiment. Differences from the first embodiment will be described below.

The parameter GL indicates the type of high-luminance-portion noise handling processing and takes a value of 0, 1, or 2. The value of 0 indicates that high-luminance-portion noise handling processing is not performed. The value of 1 or 2 indicates that the high-luminance-portion noise handling processing is performed. The parameter RC is included in the calculation expression of obtaining the coefficient Ks, when the high-luminance-portion noise handling processing is performed. The parameter RC takes a value in a range of 0≤RC<1.

Figure 20:
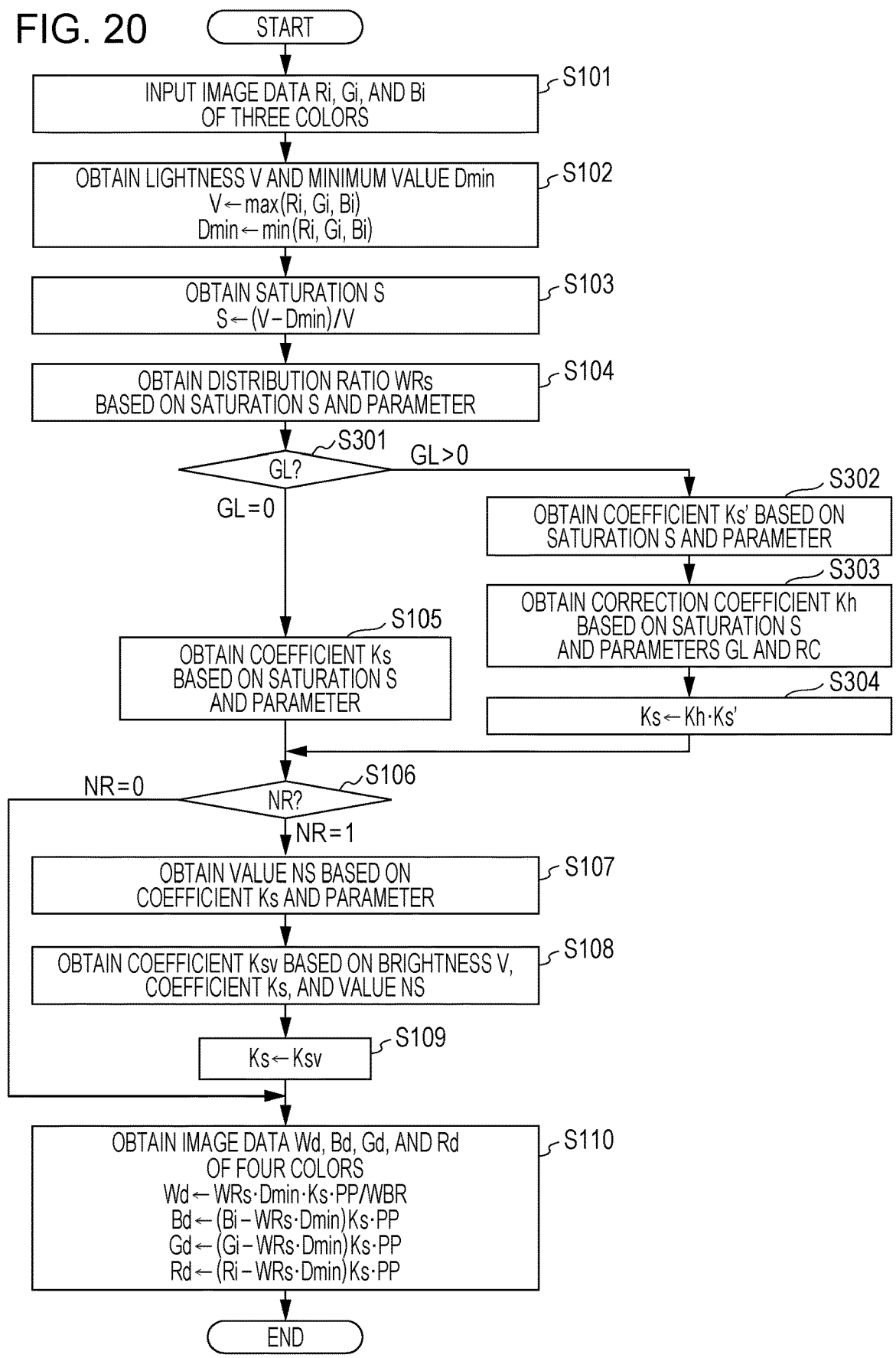
FIG. 20 is a flowchart illustrating image-data conversion processing of an image display device according to a fifth embodiment.

FIG. 20 is a flowchart illustrating image-data conversion processing according to the embodiment. The flowchart illustrated in FIG. 20 is obtained by adding Steps S301 to S304 to the flowchart illustrated in FIG. 3. In Step S101 to S104, the image data conversion unit 10 operates in a manner similar to the first embodiment.

Then, the distribution ratio-and-coefficient computation unit 13 performs condition branching in accordance with the parameter GL (Step S301). The distribution ratio-and-coefficient computation unit 13 causes the process to proceed to Step S105 at time of GL=0, and to proceed to Step 5302 at time of GL>0. In the former case, the distribution ratio-andcoefficient computation unit 13 obtains the coefficient Ks by the expression (7) (Step S105).

In the latter case, the distribution ratio-and-coefficient computation unit 13 obtains a coefficient Ks' by the following expression (17a). Then, the distribution ratio-and-coefficient computation unit 13 obtains a correction coefficient Kh by the following expression (17b) at time of GL=1, and obtains the correction coefficient Kh by the following expression (17c) at time of GL=2 (Step S303). The correction coefficient Kh increases as the saturation S becomes smaller. Then, the distribution ratio-and-coefficient computation unit 13 outputs a result obtained by multiplying the coefficient Ks' by the correction coefficient Kh, as the coefficient Ks (Step S304).

$$Ks'=1/\{1-WRs(1-S)\} \quad (17a)$$

$$Kh=1-RC \cdot S \quad (17b)$$

$$Kh=1-RC \cdot S2 \quad (17c)$$

Then, the image data conversion unit 10 operates similar to the first embodiment, in Steps S106 to S110.

Figure 21:
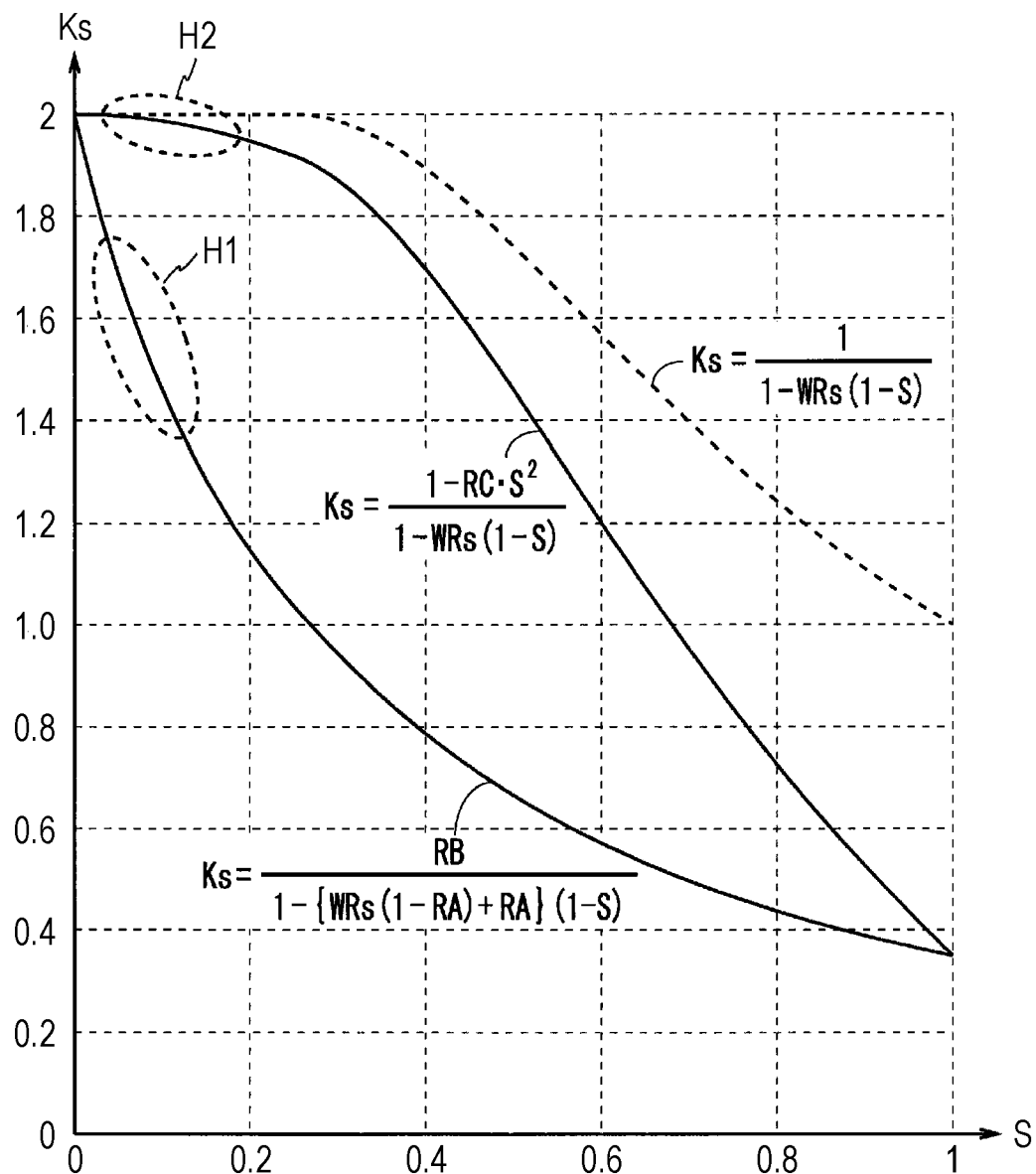
FIG. 21 is a diagram illustrating a graph of an intermediate result of the coefficient in the image display device according to the fifth embodiment.

FIG. 21 is a diagram illustrating a graph of the coefficient Ks obtained in the processes to Step S106. Here, RA=RC=0.65, RB=0.35, and WBR=0.5 are set. FIG. 21 illustrates a graph of a function Ks=RB/[1−{WRs(1−RA)+RA}(1−S)] and a graph of a function Ks=(1−RC·S2)/{1−WRs(1−S)} (the former function is referred to as a first function, and the latter function is referred to as a second function below). The distribution ratio-and-coefficient computation unit 13 obtains the coefficient Ks by using the first function at time of GL=0, and obtains the coefficient Ks by using the second function at time of GL=2. The second function is defined by using a function Ks=1/{1−WRs(1−S)} as an auxiliary function. The second function is expressed as Ks=Kh/{1−WRs(1−S)} (Kh is a function based on the saturation S) and takes the same value as that in the first function at time of S=0. The second function preferably takes the same value RB as that in the first function at time of S=1.

In a case where the coefficient Ks is obtained by using the first function, when the saturation S is small, and the luminance is high, the amount of the coefficient Ks changing with respect to the amount of the saturation S changing is large (see an H1 portion in FIG. 21). Therefore, in a case where the coefficient Ks is obtained by using the first function, gradation skipping occurs in a display image, and compression noise components and the like which originally have a small luminance difference and have been inconspicuous becomes conspicuous. Thus, noise may occur at a high-luminance portion included in the display image. On the contrary, in a case where the coefficient Ks is obtained by using the second function, even when the saturation S is small and the luminance is high, the amount of the coefficient Ks changing with respect to the amount of the saturation S changing is small (see an H2 portion in FIG. 21). Thus, if the coefficient Ks is obtained by using the second function, it is possible to suppress an occurrence of gradation skipping occurring in a display image, and to suppress the occurrence of noise occurring at a high-luminance portion included in the display image.

As described above, in the image display device according to the embodiment, at time of GL>0, for each pixel, the image data conversion unit 10 obtains the distribution ratio WRs, the tentative coefficient Ks', and the correction coefficient Kh decreasing as the saturation S becomes greater, based on the saturation S. The image data conversion unit outputs a result obtained by multiplying the tentative coefficient Ks' by the correction coefficient Kh, as the coefficient Ks. Thus, according to the image display device according to the embodiment, it is possible to suppress the occurrence of noise at a low-luminance portion of a display image along with an occurrence of noise at a high-luminance portion of the display image.

Sixth Embodiment

Figure 22:
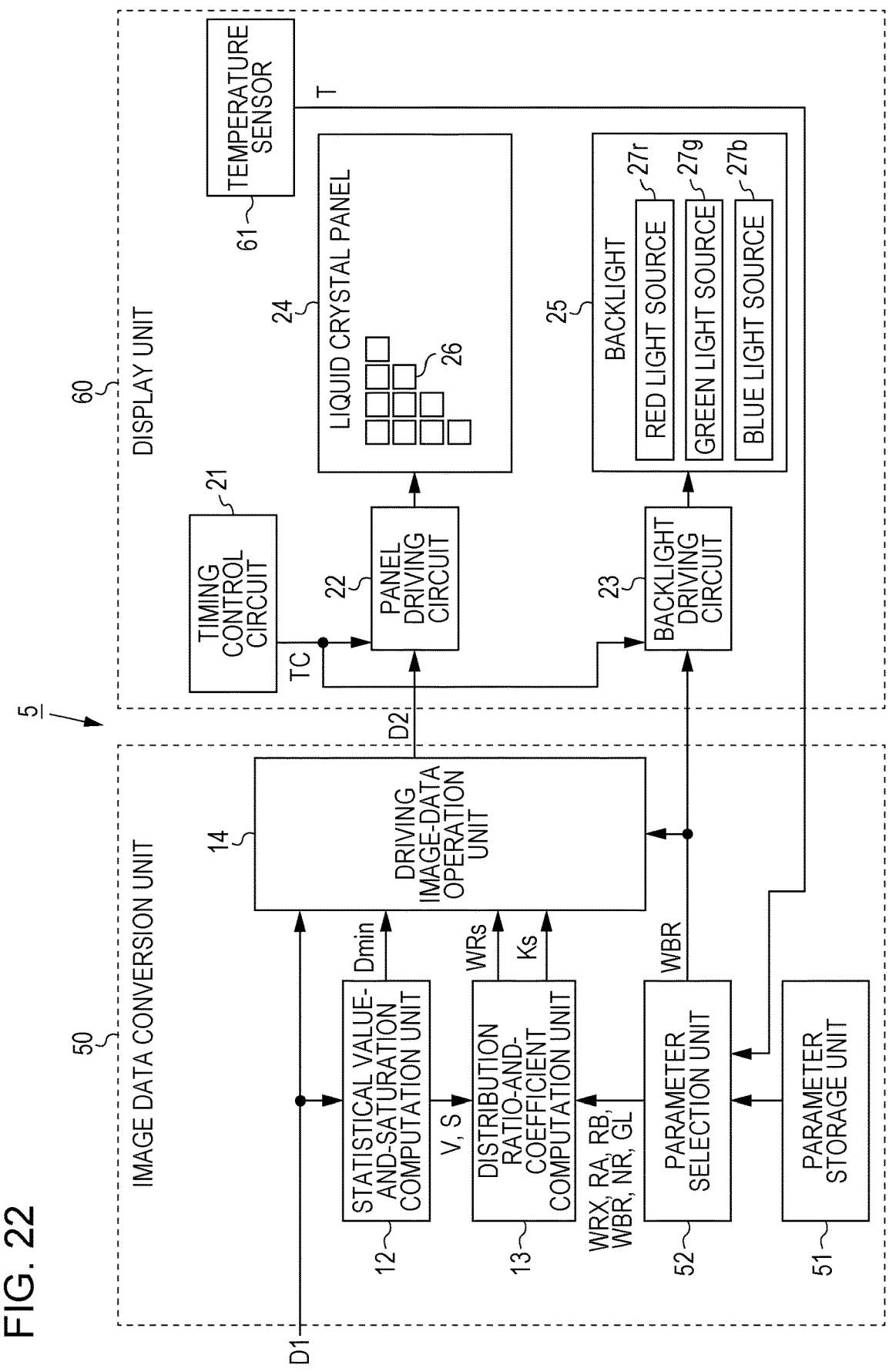
FIG. 22 is a block diagram illustrating a configuration of an image display device according to a sixth embodiment.

FIG. 22 is a block diagram illustrating a configuration of an image display device according to a sixth embodiment. An image display device 5 illustrated in FIG. 22 includes an image data conversion unit 50 and a display unit 60. The image data conversion unit 50 is obtained by adding a parameter selection unit 52 to the image data conversion unit 10 according to the fifth embodiment and replacing the parameter storage unit 11 with a parameter storage unit 51. The display unit 60 is obtained by adding a temperature sensor 61 to the display unit 20 according to the fifth embodiment. Differences from the fifth embodiment will be described below.

The temperature sensor 61 is provided in the display unit 60 and measures the temperature T of the display unit 60. The temperature sensor 61 is provided, for example, in the vicinity of the liquid crystal panel 24. The temperature T measured by the temperature sensor 61 is input to the parameter selection unit 52.

The parameter storage unit 51 stores a plurality of values for the parameters WRX, RA, RB, WBR, NR, and GL, in accordance with the temperature. The parameter selection unit 52 selects values from the plurality of values stored in the parameter storage unit 51, in accordance with the temperature T measured by the temperature sensor 61. Then, the parameter selection unit outputs the selected values as the parameters WRX, RA, RB, WBR, NR, and GL. The parameters WRX, RA, RB, WBR, NR, and GL output from the parameter selection unit 52 are input to the distribution ratio-and-coefficient computation unit 13 and the backlight driving circuit 23.

As described above, in the image display device 5 according to the embodiment, the image data conversion unit 50 includes the parameter storage unit 51 that stores the parameters WRX, RA, RB, WBR, and NR used in conversion processing (image-data conversion processing). The display unit 60 includes the temperature sensor 61. The parameter storage unit 51 stores the plurality of values for the parameters WRX, RA, RB, WBR, NR, and GL in accordance with the temperature. The image data conversion unit 50 selects values depending on the temperature T measured by the temperature sensor 61, among the plurality of values stored in the parameter storage unit 51. The selected values are used in the conversion processing. Thus, according to the image display device 5, the conversion processing is performed based on the parameters WRX, RA, RB, WBR, NR, and GL in accordance with the temperature T of the display unit 60. Accordingly, it is possible to improve color reproduction even in a case where the response characteristics of the display unit 60 change depending on the temperature.

Seventh Embodiment

Figure 23:
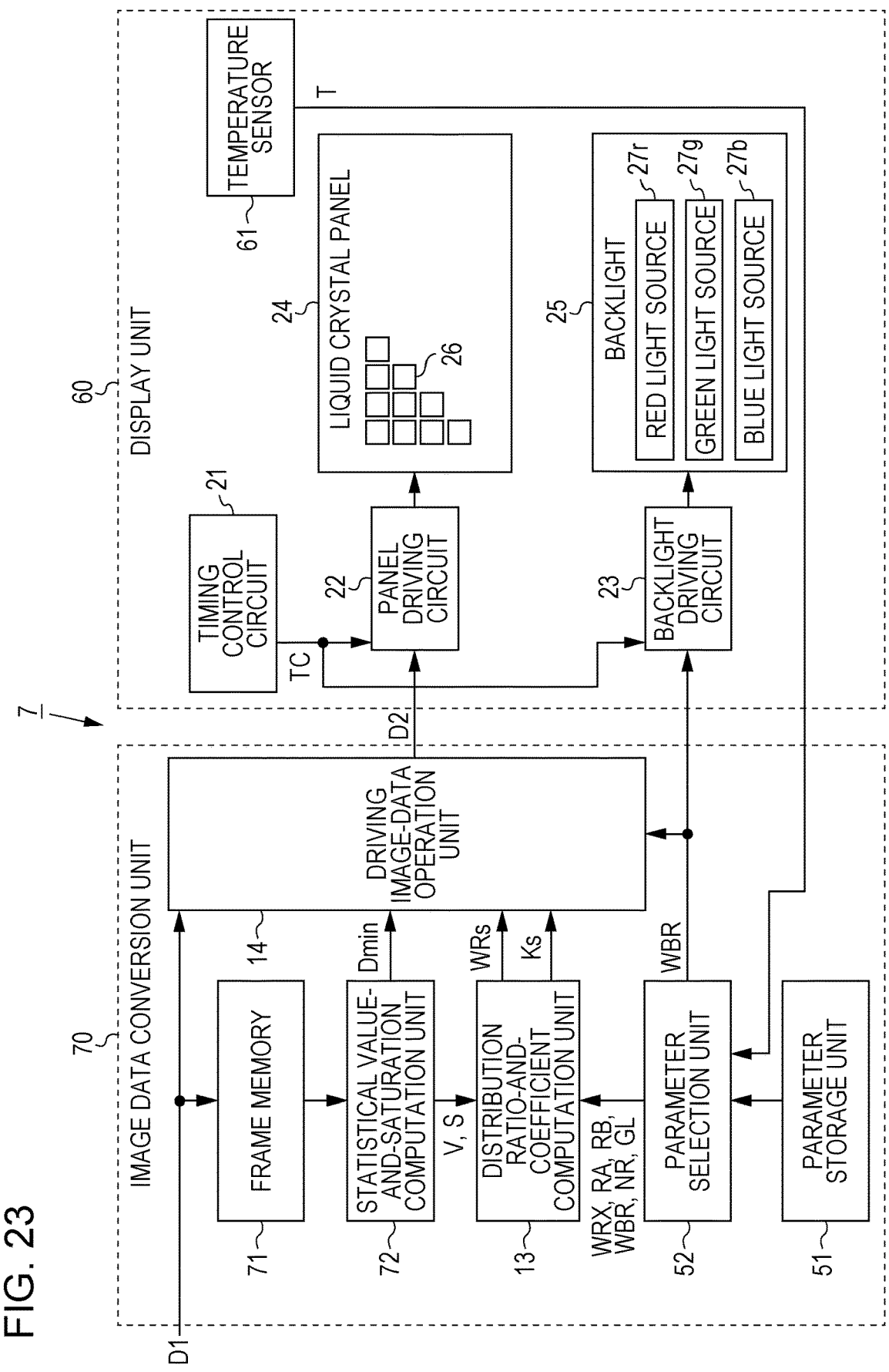
FIG. 23 is a block diagram illustrating a configuration of an image display device according to a seventh embodiment.

FIG. 23 is a block diagram illustrating a configuration of an image display device according to a seventh embodiment. An image display device 7 illustrated in FIG. 23 includes an image data conversion unit 70 and the display unit 60. The image data conversion unit 70 is obtained by adding a frame memory 71 to the image data conversion unit 50 according to the sixth embodiment and replacing the statistical value-and-saturation computation unit 12 with a statistical value-and-saturation computation unit 72. Differences from the sixth embodiment will be described below.

Input image data D1 including red image data, green image data, and blue image data is input to the image display device 7. The frame memory 71 stores input image data D1 corresponding to one frame or a plurality of frames.

Similar to the statistical value-and-saturation computation unit 12, the statistical value-and-saturation computation unit 72 obtains the minimum value Dmin, the brightness V, and the saturation S based on the input image data D1, for each pixel. At this time, the statistical value-and-saturation computation unit 72 obtains, for each pixel, the minimum value Dmin, the brightness V, and the saturation S based on the input image data D1 which has been stored in the frame memory 71 and corresponds to a plurality of pixels.

For example, when obtaining the saturation S of a certain pixel, the statistical value-and-saturation computation unit 72 may obtain the saturation for a plurality of pixels in the vicinity of this pixel, and obtain an average value, the maximum value, or the minimum value of a plurality of saturations which have been obtained. The statistical value-and-saturation computation unit 72 may perform weighting to the saturation in the neighboring pixel, in accordance with a distance or the like from the neighboring pixel and then perform calculation. Thus, since the saturation S is smoothly changed in a spatial direction or the value of the coefficient Ks in accordance with the saturation S is reduced, it is possible to reduce disharmony of an image, which occurs by a luminance difference varying depending on the saturation S. The statistical value-and-saturation computation unit 72 may obtain the saturation S by applying a filter operation to the saturation obtained for the previous frame and the saturation obtained for the current frame. The statistical value-and-saturation computation unit 72 may perform weighting to the saturation of the previous frame in accordance with a time difference or the like from the current frame, and then perform calculation. Thus, since the saturation S is smoothly changed in a time direction or the value of the coefficient Ks in accordance with the saturation S is reduced, it is possible to reduce disharmony of an image, which occurs by a luminance difference in the time direction, which varies depending on the saturation S. The statistical value-and-saturation computation unit 72 obtains the minimum value Dmin and the brightness V with the similar methods.

As described above, in the image display device 7 according to the embodiment, the image data conversion unit 70 includes the frame memory 71 that stores first image data (input image data D1), and performs conversion processing based on the first image data corresponding to a plurality of pixels stored in the frame memory 71, for each pixel. Thus, according to the image display device 7, it is possible to prevent a rapid change of the distribution ratio WRs and the coefficient Ks and to prevent an occurrence of a situation in which the color of a pixel 26 rapidly changes in the spatial direction or the time direction.

Figure 24:
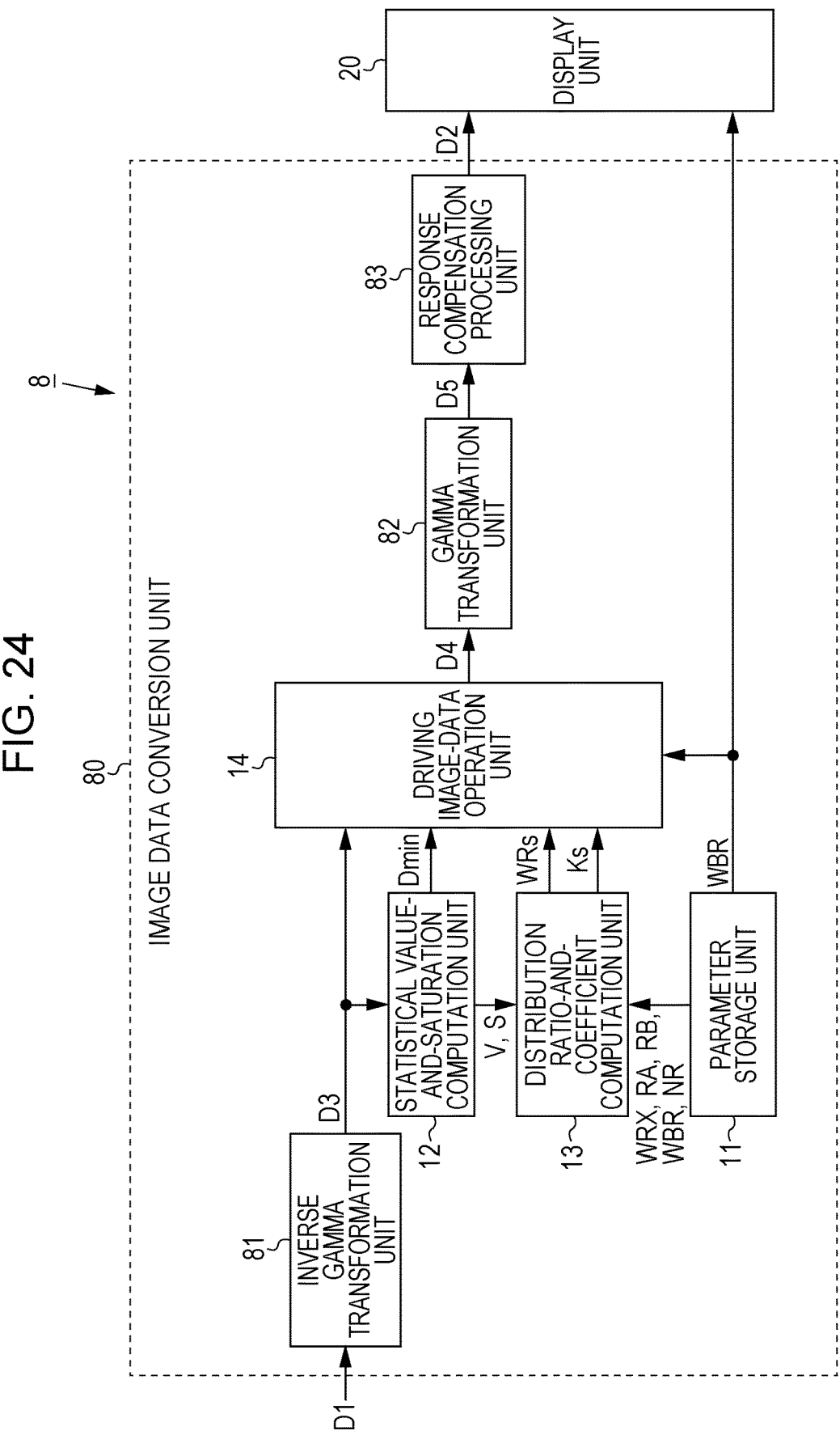
FIG. 24 is a block diagram illustrating a configuration of an image display device according to a modification example of the first embodiment.

Regarding the image display device in the embodiments, the following modification example can be made. FIG. 24 is a block diagram illustrating a configuration of an image display device according to a modification example of the first embodiment. In an image display device 8 illustrated in FIG. 24, an image data conversion unit 80 is obtained by adding an inverse gamma transformation unit 81, a gamma transformation unit 82, and a response compensation processing unit 83 to the image data conversion unit 10 according to the first embodiment.

Input image data D1 to be input to the image display device 8 is gradation data before inverse gamma transformation is performed. The inverse gamma transformation unit 81 performs inverse gamma transformation on the input image data D1 so as to obtain image data D3 after inverse gamma transformation. The parameter storage unit 11, the statistical value-and-saturation computation unit 12, the distribution ratio-and-coefficient computation unit 13, and the driving image-data operation unit 14 perform kinds of processing similar to those in the first embodiment, on the image data D3 after the inverse gamma transformation, respectively. Thus, image data D4 before gamma transformation is obtained. The gamma transformation unit 82 performs gamma transformation on the image data D4 before the gamma transformation, so as to obtain image data D5. The response compensation processing unit 83 performs response compensation processing on the image data D5 so as to obtain driving image data D2. In the response compensation processing unit 83, overdrive processing (also referred to as overshoot processing) of compensating for insufficiency of the response rate of a pixel 26.

In the image display device 8 according to the modification example, the image data conversion unit 80 obtains driving image data D2 in a manner that conversion processing (image-data conversion processing) of converting first image data (image data D3 after the inverse gamma transformation) corresponding to a plurality of color components into second image data (image data D4 before the gamma transformation) corresponding to a plurality of subframes is performed for each pixel, and response compensation processing is performed on image data D5 after the conversion processing has been performed. Thus, according to the image display device 8, it is possible to display a desired image even in a case where the response rate of the display unit 60 is slow.

The image data conversion unit 80 includes the inverse gamma transformation unit 81, the gamma transformation unit 82, and the response compensation processing unit 83. Instead, the image data conversion unit may include the inverse gamma transformation unit 81 and the gamma transformation unit 82, but may not include the response compensation processing unit 83. Alternatively, the image data conversion unit may include the response compensation processing unit 83, but may not include the inverse gamma transformation unit 81 and the gamma transformation unit 82. At least one of the inverse gamma transformation unit 81 and the gamma transformation unit 82, and the response compensation processing unit 83 may be added to the image data conversion unit according to the second to fifth embodiments. The gamma transformation may be performed after the response compensation processing. In this case, the response compensation processing is performed on image data output from the driving image-data operation unit. The gamma transformation is performed on image data after the response compensation processing.

In the first to fourth, and sixth and seventh embodiments, the distribution ratio-and-coefficient computation unit obtains the coefficient Ks so as to satisfy the expression (1), and thus the expression of RB=1−RA is satisfied (see FIG. 2). Instead, the distribution ratio-and-coefficient computation unit may obtain the coefficient Ks such that the minimum value DDmin and the maximum value DDmax are in a certain limited range which has been set in a range satisfying 0≤DDmin≤1 and 0≤DDmax≤1. For example, the border of the limited range illustrated in FIG. 2 is a straight line. However, in a case where high-luminance noise handling has been performed in the fifth to seventh embodiments, the border of the limited range may be a curved line which is consequently realized as the limited range or may be a polygonal line having a curved point. Here, the border of the limited range is preferably a straight line or a curved line.

In the first to seventh embodiments, the image display device that obtains the distribution ratio WRs and the coefficients Ks and Ksv by specific calculation expressions is described. However, as the calculation expressions of obtaining the distribution ratio WRs and the coefficients Ks and Ksv, expressions other than the calculation expressions described in the embodiments may be provided. For example, as the calculation expression of obtaining the distribution ratio WRs, a calculation expression which has been known from the past may be used. As the calculation expression of obtaining the coefficient Ksv, any calculation expression satisfying the expression (11) may be used. As the similar image display device, a field sequential type image display device other than a liquid crystal display apparatus, a see-through image display device having a function of seeing through the back of the display panel, or the like may be configured.

As described above, a field sequential type image display device may include an image data conversion unit that obtains driving image data corresponding to a plurality of subframes including a common color subframe, based on input image data corresponding to a plurality of color components, and a display unit that displays the plurality of subframes based on the driving image data, in one frame period. The image data conversion unit fray perform conversion processing of converting first image data corresponding to the plurality of color components into second image data corresponding to the plurality of subframes, for each pixel. In the conversion processing, a hue and a saturation of the first image data and a hue and a saturation of the second image data in an HSV color space may be to be respectively equal to each other. The image data conversion unit may compute a coefficient used in the conversion processing and perform the conversion processing using the coefficient. The coefficient may vary depending on a brightness and have a value causing a brightness after the conversion processing to increase as the brightness becomes greater if the saturations are equal to each other. A difference between the minimumvalue and the maximum value of the coefficient may become smaller as the brightness decreases (first aspect).

The image data conversion unit may obtain a distribution ratio indicating a value to be distributed to the common color subframe and the coefficient used in amplification and compression processing, perform the conversion processing using the distribution ratio and the coefficient, and obtain the distribution ratio based on the saturation for each pixel, such that the second image data corresponding to the common color subframe is in a range from the minimum value of the second image data corresponding to other subframes to the maximum value thereof (second aspect). The image data conversion unit may obtain the distribution ratio and the coefficient in accordance with functions having a value which smoothly changes depending on the saturation (third aspect). In the conversion processing, a range of the maximum value of the second image data in one frame period may be determined in accordance with the minimum value of the second image data in the one frame period (fourth aspect). The display unit may include a light source and control a luminance of the light source when displaying the common color subframe (fifth aspect).

The image data conversion unit may obtain the distribution ratio, a tentative coefficient, and a correction coefficient decreasing as the saturation increases, based on the saturation, and obtain a result obtained by multiplying the tentative coefficient by the correction coefficient, as the coefficient, for each pixel (sixth aspect). The display unit may include a light source and control a luminance of the light source when displaying the common color subframe (seventh aspect).

The image data conversion unit may obtain the distribution ratio increasing as the saturation increases, for each pixel (eighth aspect). In the conversion processing, a range of the maximum value of the second image data in one frame period may be determined in accordance with the minimum value of the second image data in the one frame period (ninth aspect). The display unit may include a light source and control a luminance of the light source when displaying the common color subframe (tenth aspect). The image data conversion unit may obtain the distribution ratio, a tentative coefficient, and a correction coefficient decreasing as the saturation increases, based on the saturation, and obtain a result obtained by multiplying the tentative coefficient by the correction coefficient, as the coefficient, for each pixel (11th aspect). The display unit may include a light source and control a luminance of the light source when displaying the common color subframe (12th aspect).

The image data conversion unit may include a parameter storage unit that stores a parameter used in the conversion processing. The parameter storage unit may store a first parameter in accordance with response characteristics of a pixel provided in the display unit (13th aspect). The parameter storage unit may further store a second parameter for designating a range of the maximum value of the second image data in one frame period in accordance with the minimum value of the second image data in the one frame period (14th aspect). The parameter storage unit may further store a third parameter for designating a luminance of a light source provided in the display unit of when the common color subframe is displayed. The display unit may control the luminance of the light source in accordance with the third parameter when displaying the common color subframe (15th aspect).

The image data conversion unit may store a parameter storage unit that stores a parameter used in the conversion processing. The display unit may include a temperature sensor. The parameter storage unit may store a plurality of values for the parameter, in accordance with a temperature. The image data conversion unit may select the value in accordance with the temperature measured by the temperature sensor among the plurality of values stored in the parameter storage unit and use the selected value in the conversion processing (16th aspect). The image data conversion unit may include a frame memory that stores the first image data, and perform the conversion processing for each pixel, based on pieces of the first image data, which have been stored in the frame memory and correspond to a plurality of pixels (17th aspect).

The image data conversion unit may perform the conversion processing on normalized luminance data (18th aspect). The image data conversion unit may obtain the driving image data by performing response compensation processing on image data obtained after the conversion processing (19th aspect). The input image data may correspond to red, green, and blue. The driving image data may correspond to red, green, blue, and white subframes. The common color subframe may be a white subframe (20th aspect).

A field sequential type image display method may include an image-data conversion step of obtaining driving image data corresponding to a plurality of subframes including a common color subframe, based on input image data corresponding to a plurality of color components, and a display step of displaying the plurality of subframes based on the driving image data, in one frame period. In the image-data conversion step, conversion processing of converting first image data corresponding to the plurality of color components into second image data corresponding to the plurality of subframes may be performed for each pixel. In the conversion processing, a hue and a saturation of the first image data and a hue and a saturation of the second image data in an HSV color space may be held to be respectively equal to each other. In the image-data conversion step, a coefficient used in the conversion processing may be computed, and the conversion processing may be performed using the coefficient. The coefficient may vary depending on a brightness and have a value causing a brightness after the conversion processing to increase as the brightness becomes greater if the saturations are equal to each other. A difference between the minimum value and the maximum value of the coefficient may become smaller as the brightness decreases (21st aspect).

According to the first or 21st aspect, since the coefficient is obtained to vary depending on the brightness and to have a value causing a brightness after the conversion processing to increase as the brightness becomes greater if the saturation is the same. Thus, it is possible to hold the gradation properties. The difference between the minimum value and the maximum value of the coefficient is set to decrease as the brightness becomes smaller. Thus, it is possible to suppress the occurrence of noise at a low-luminance portion of a display image by reducing the amount of the coefficient changing with respect to the amount of the saturation changing, when the brightness is small. Thus, it is possible to suppress the occurrence of noise at a low-luminance portion of a display image while gradation properties are held.

According to the second aspect, the distribution ratio is obtained such that the second image data corresponding to the common color subframe is in a range from the minimum value of the second image data corresponding to other subframes to the maximum value thereof. Thus, it is possible to suppress the change of image data after conversion in one frame period and to improve color reproduction. According to the third aspect, the distribution ratio and the coefficient are obtained by the functions which smoothly change depending on the saturation. Thus, it is possible to prevent the occurrence of distortion of an image when a gradation image is displayed.

According to the fourth or ninth aspect, the range of maximum value of the second image data in one frame period is determined in accordance with the minimum value of the second image data in one frame period. Thus, it is possible to suppress the change of the image data after the conversion in one frame period and to improve color reproduction. According to the fifth, seventh, tenth, or 12th aspect, the luminance of the light source of when a common color subframe is displayed is controlled. Thus, it is possible to reduce heat generated by the light source.

According to the sixth or 11th aspect, the distribution ratio, the tentative coefficient, and the correction coefficient decreasing as the saturation becomes greater are obtained, and the result obtained by multiplying the tentative coefficient by the correction coefficient is obtained as the coefficient. Thus, it is possible to suppress the occurrence of noise at a high-luminance portion of a display image along with the occurrence of noise at a low-luminance portion of the display image. According to the eighth aspect, the distribution ratio increasing as the saturation becomes greater is obtained. Thus, it is possible to suppress an occurrence of color breakup by increasing a ratio of a value distributed to a common color subframe as the saturation becomes greater.

According to the 13th aspect, it is possible to improve color reproduction by setting the suitable first parameter in accordance with the response characteristics of the display unit. According to the 14th aspect, the maximum value of driving image data in one frame period is limited in accordance with the minimum value of the driving image data in one frame period, by using the second parameter. Thus, it is possible to improve color reproduction. According to the 15th aspect, the luminance of the light source of when a common color subframe is displayed is controlled by using the third parameter. Thus, it is possible to reduce heat generated by the light source.

According to the 16th aspect, the conversion processing is performed based on the parameter in accordance with the temperature of the display unit. Thus, it is possible to improve color reproduction even in a case where the response characteristics of the display unit change in accordance with the temperature. According to the 17th aspect, the conversion processing is performed based on the first image data corresponding to the plurality of pixels. Thus, it is possible to prevent the occurrence of a situation in which the color of a pixel 26 rapidly changes in the spatial direction or the time direction.

According to the 18th aspect, the conversion processing is performed on normalized luminance data. Thus, it is possible to accurately perform the conversion processing. According to the 19th aspect, the response compensation processing is performed on image data after the conversion processing has been performed. Thus, it is possible to display a desired image even in a case where the response rate of the display unit is slow. According to the 20th aspect, in the image display device that displays subframes of three primary colors and the white color based on input image data D1 corresponding to the three primary colors, it is possible to suppress the occurrence of noise at a low-luminance portion of a display image while the gradation properties are held.

This application claims priority right based on Japanese Patent Application No. 2016-88211 entitled "field-sequential image display device and image display method" filed on Apr. 26, 2016, and the contents of this application are included in the present application by reference.

REFERENCE SIGNS LIST 1, 3, 5, 7, 8 IMAGE DISPLAY DEVICE
10, 30, 50, 70, 80 IMAGE DATA CONVERSION UNIT
20, 40, 60 DISPLAY UNIT
11, 31, 51 PARAMETER STORAGE UNIT
12, 72 STATISTICAL VALUE-AND-SATURATION COMPUTATION UNIT
13, 32 DISTRIBUTION RATIO-AND-COEFFICIENT COMPUTATION UNIT
14, 33 DRIVING IMAGE-DATA OPERATION UNIT
21 TIMING CONTROL CIRCUIT
22 PANEL DRIVING CIRCUIT
23, 41 BACKLIGHT DRIVING CIRCUIT
24 LIQUID CRYSTAL PANEL
25 BACKLIGHT
26 PIXEL

27 LIGHT SOURCE
52 PARAMETER SELECTION UNIT
61 TEMPERATURE SENSOR
71 FRAME MEMORY
81 INVERSE GAMMA TRANSFORMATION UNIT
82 GAMMA TRANSFORMATION UNIT
83 RESPONSE COMPENSATION PROCESSING UNIT

The invention claimed is:

1. An image display device of a field sequential type comprising:
an image data conversion unit that obtains driving image data corresponding to a plurality of subframes including a common color subframe based on input image data corresponding to a plurality of color components; and
a display unit that displays the plurality of subframes based on the driving image data, in one frame period,
wherein the image data conversion unit performs conversion processing of converting first image data corresponding to the plurality of color components into second image data corresponding to the plurality of subframes, for each pixel,
in the conversion processing, for each pixel, a hue and a saturation of the first image data and a hue and a saturation of the second image data in a hue-saturation-value (HSV) color space are held to be respectively equal to each other,
the image data conversion unit computes a coefficient used in the conversion processing and performs the conversion processing using the coefficient,
the coefficient varies depending on a brightness of the input image data and has a value causing the brightness after the conversion processing to increase as the brightness becomes greater if saturations are equal to each other, and
a difference between a minimum value and a maximum value of the coefficient becomes smaller as the brightness decreases.

2. The image display device according to claim 1, wherein the image data conversion unit
obtains a distribution ratio indicating a value to be distributed to the common color subframe and the coefficient used in amplification and compression processing,
performs the conversion processing using the distribution ratio and the coefficient, and
obtains the distribution ratio based on the saturation for each pixel, such that the second image data corresponding to the common color subframe is in a range from a minimum value of the second image data corresponding to other subframes to a maximum value of the second image data corresponding to other subframes.

3. The image display device according to claim 2, wherein the image data conversion unit obtains the distribution ratio and the coefficient in accordance with functions having a value which smoothly changes depending on the saturation.

4. The image display device according to claim 3, wherein, in the conversion processing, a range of the maximum value of the second image data in one frame period is determined in accordance with the minimum value of the second image data in the one frame period.

5. The image display device according to claim 4, wherein the display unit includes a light source and controls a luminance of the light source when displaying the common color subframe.

6. The image display device according to claim 3, wherein, for each pixel, the image data conversion unit
obtains the distribution ratio, a tentative coefficient, and a correction coefficient decreasing as the saturation increases, based on the saturation, and
obtains a result obtained by multiplying the tentative coefficient by the correction coefficient, as the coefficient.

7. The image display device according to claim 6, wherein the display unit includes a light source and controls a luminance of the light source when displaying the common color subframe.

8. The image display device according to claim 2, wherein the image data conversion unit obtains the distribution ratio increasing as the saturation increases, for each pixel.

9. The image display device according to claim 8, wherein, in the conversion processing, a range of the maximum value of the second image data in one frame period is determined in accordance with the minimum value of the second image data in the one frame period.

10. The image display device according to claim 9, wherein the display unit includes a light source and controls a luminance of the light source when displaying the common color subframe.

11. The image display device according to claim 8, wherein, for each pixel, the image data conversion unit
obtains the distribution ratio, a tentative coefficient, and a correction coefficient decreasing as the saturation increases, based on the saturation, and
obtains a result obtained by multiplying the tentative coefficient by the correction coefficient, as the coefficient.

12. The image display device according to claim 11, wherein the display unit includes a light source and controls a luminance of the light source when displaying the common color subframe.

13. The image display device according to claim 1, wherein the image data conversion unit includes a parameter storage unit that stores a parameter used in the conversion processing, and
the parameter storage unit stores a first parameter in accordance with response characteristics of a pixel provided in the display unit.

14. The image display device according to claim 13, wherein the parameter storage unit further stores a second parameter for designating a range of a maximum value of the second image data in one frame period in accordance with a minimum value of the second image data in the one frame period.

15. The image display device according to claim 14, wherein the parameter storage unit further stores a third parameter for designating a luminance of a light source provided in the display unit when the common color subframe is displayed, and
the display unit controls the luminance of the light source in accordance with the third parameter when displaying the common color subframe.

16. The image display device according to claim 1, wherein the image data conversion unit stores a parameter storage unit that stores a parameter used in the conversion processing,
the display unit includes a temperature sensor,
the parameter storage unit stores a plurality of values for the parameter in accordance with a temperature, and
the image data conversion unit selects the value in accordance with the temperature measured by the temperature sensor among the plurality of values stored in the parameter storage unit and uses the selected value in the conversion processing.

17. The image display device according to claim 1, wherein the image data conversion unit includes a frame memory that stores the first image data and performs the conversion processing for each pixel, based on pieces of the first image data, which have been stored in the frame memory and correspond to a plurality of pixels.

18. The image display device according to claim 1, wherein the image data conversion unit performs the conversion processing on normalized luminance data.

19. The image display device according to claim 18, wherein the image data conversion unit obtains the driving image data by performing response compensation processing on image data obtained after the conversion processing.

20. The image display device according to claim 1, wherein the input image data corresponds to red, green, and blue, the driving image data corresponds to red, green, blue, and white subframes, and the common color subframe is a white subframe.

21. An image display method of a field sequential type comprising:

converting image data by obtaining driving image data corresponding to a plurality of subframes including a common color subframe based on input image data corresponding to a plurality of color components; and displaying the plurality of subframes based on the driving image data, in one frame period, wherein, in converting the image data, conversion processing of converting first image data corresponding to the plurality of color components into second image data corresponding to the plurality of subframes is performed for each pixel, in the conversion processing, for each pixel, a hue and a saturation of the first image data and a hue and a saturation of the second image data in a hue-saturation-value (HSV) color space are held to be respectively equal to each other, in converting the image data, a coefficient used in the conversion processing is computed, and the conversion processing is performed using the coefficient, the coefficient varies depending on a brightness of the input image data and has a value causing the brightness after the conversion processing to increase as the brightness becomes greater if saturations are equal to each other, and a difference between a minimum value and a maximum value of the coefficient becomes smaller as the brightness decreases.

* * * * *